(12) United States Patent
Zhang et al.

(10) Patent No.: US 12,153,431 B2
(45) Date of Patent: Nov. 26, 2024

(54) VEHICLE OBJECT-ENGAGEMENT SCANNING SYSTEM AND METHOD

(71) Applicant: Seegrid Corporation, Pittsburgh, PA (US)

(72) Inventors: Chun Zhang, Carnegie, PA (US); Nathan Greco, Pittsburgh, PA (US); Adam Grusky, Pittsburgh, PA (US); Bruce Thompson, Pittsburgh, PA (US); Ed Butina, Coraopolis, PA (US); Jacob Seal, Pittsburgh, PA (US); John Harrold, II, Pittsburgh, PA (US); Ryan Young, Pittsburgh, PA (US); Benjamin Schmidt, Wexford, PA (US); Andrew Tracy, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 116 days.

(21) Appl. No.: 17/490,345

(22) Filed: Sep. 30, 2021

(65) Prior Publication Data

US 2022/0100195 A1 Mar. 31, 2022

Related U.S. Application Data

(60) Provisional application No. 63/085,416, filed on Sep. 30, 2020.

(51) Int. Cl.
*G05D 1/00* (2024.01)
(52) U.S. Cl.
CPC ......... *G05D 1/0212* (2013.01); *G05D 1/0094* (2013.01)
(58) Field of Classification Search
CPC ............... G05D 1/0212; G05D 1/0094; G05D 2201/0216; G05D 1/0225
See application file for complete search history.

(56) References Cited

U.S. PATENT DOCUMENTS 8,538,577 B2 9/2013 Bell et al.
8,591,165 B2 11/2013 Chilson
(Continued)

FOREIGN PATENT DOCUMENTS

CN 110054116 7/2019
DE 102017221064 10/2018
(Continued)

OTHER PUBLICATIONS

International Search Report and Written Opinion dated Jan. 14, 2022 issued in corresponding International Application No. PCT/US2021/052853.
(Continued)

*Primary Examiner* — Christian Chace
*Assistant Examiner* — Katherine Marie Fitzharris
(74) *Attorney, Agent, or Firm* — Onello & Mello, LLP

(57) ABSTRACT

A transport vehicle, such as a vision guided vehicle, can comprise a drive portion constructed to facilitate movement of the transport vehicle and a load portion constructed to engage an object of interest. The load portion can comprise an object engagement apparatus and at least one sensor coupled to or disposed within a distal end of the object engagement apparatus, wherein the sensor can be at least a 2D sensor. The engagement apparatus can comprise forks, at least one fork having sensor coupled to or disposed within a fork tip. The 2D sensor can comprise a scanning LIDAR sensor arranged to collect information to identify a pickable pallet, for example.

22 Claims, 20 Drawing Sheets

(56) References Cited

U.S. PATENT DOCUMENTS

| | | | |
|---|---|---|---|
| 9,177,225 B1 * | 11/2015 | Cordova-Diba | G06T 7/12 |
| 9,561,941 B1 | 2/2017 | Watts | |
| 10,048,398 B2 | 8/2018 | Rose et al. | |
| 10,214,400 B2 | 2/2019 | High et al. | |
| 10,328,578 B2 | 6/2019 | Holz | |
| 10,346,797 B2 | 7/2019 | Jacobus et al. | |
| 10,773,938 B2 | 9/2020 | Kim et al. | |
| 10,954,111 B2 | 3/2021 | Kim et al. | |
| 2009/0271058 A1 | 10/2009 | Chilson | |
| 2011/0218670 A1 | 9/2011 | Bell et al. | |
| 2014/0074341 A1 | 3/2014 | Weiss | |
| 2017/0015537 A1 | 1/2017 | Bosworth, III et al. | |
| 2018/0081369 A1 * | 3/2018 | Fischer | G01S 17/08 |
| 2018/0089616 A1 | 3/2018 | Jacobus et al. | |
| 2018/0120465 A1 * | 5/2018 | Rose | B66F 9/063 |
| 2018/0273292 A1 | 9/2018 | High et al. | |
| 2018/0304468 A1 | 10/2018 | Holz | |
| 2018/0312382 A1 | 11/2018 | Kim et al. | |
| 2020/0109038 A1 | 4/2020 | Nagasawa | |
| 2020/0369499 A1 | 11/2020 | Kim et al. | |

FOREIGN PATENT DOCUMENTS

| | | | |
|---|---|---|---|
| EP | 2468678 | | 6/2012 |
| EP | 3770107 | | 1/2021 |
| JP | 2002087793 | | 3/2002 |
| JP | 4293565 | | 7/2009 |
| JP | 2022034408 A | * | 3/2022 |

OTHER PUBLICATIONS

Extended European Search Report dated Jun. 13, 2024 issued in European Application No. 21876464.5.

* cited by examiner

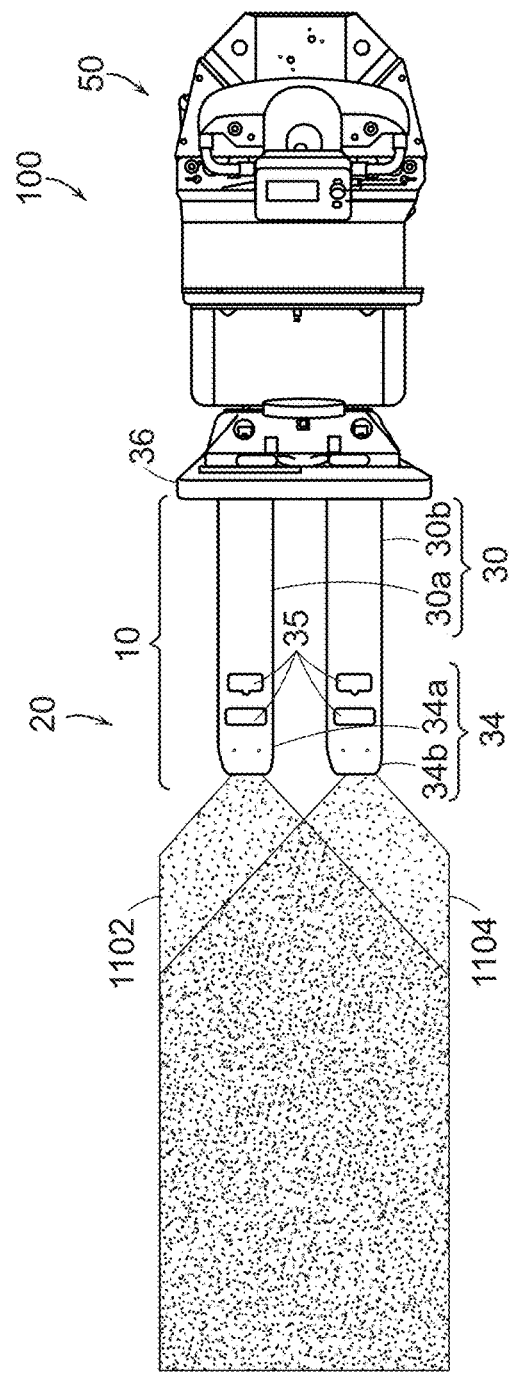
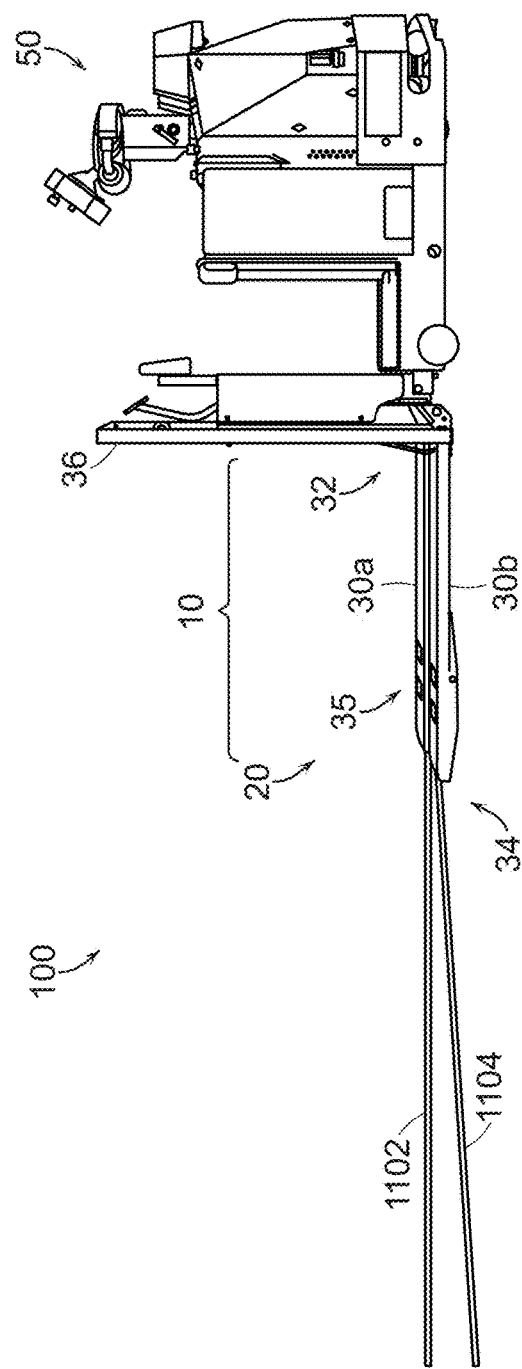
FIG. 2A
FIG. 2B

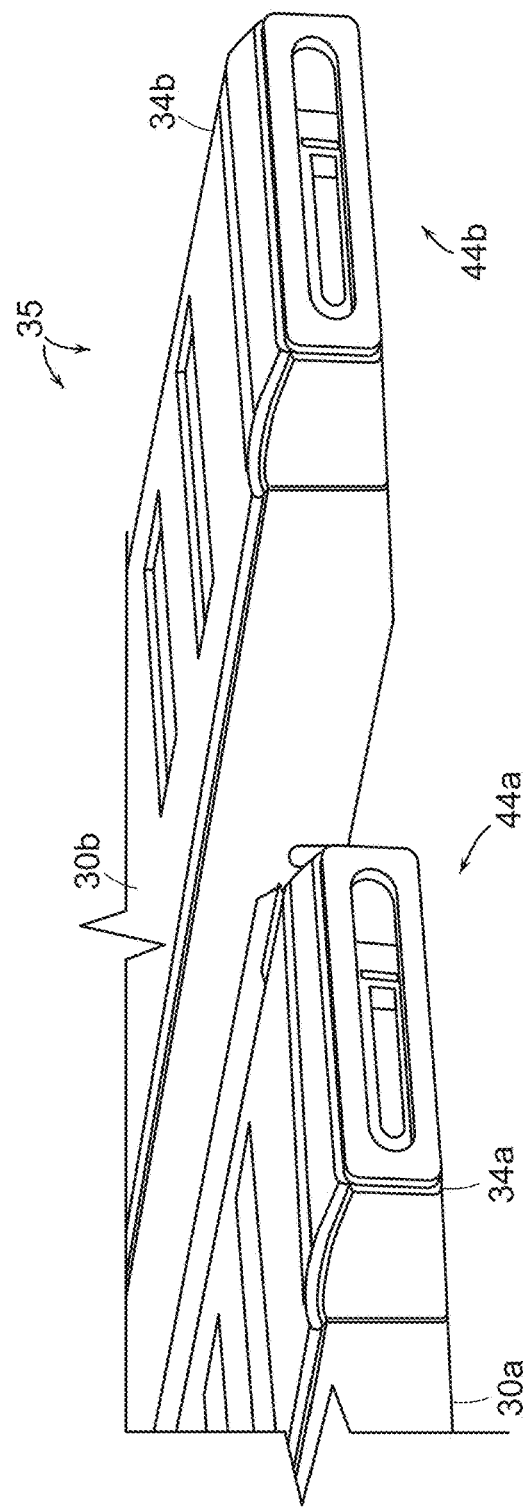
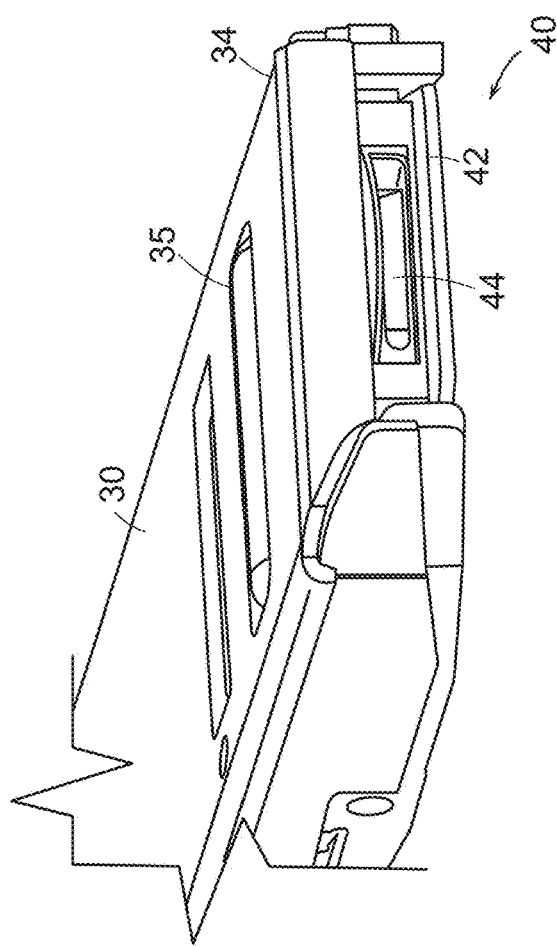
FIG. 3A
FIG. 3B

VEHICLE OBJECT-ENGAGEMENT SCANNING SYSTEM AND METHOD

RELATED APPLICATIONS

This application claims benefit of U.S. Provisional Application No. 63/085,416, filed Sep. 30, 2020, and entitled VEHICLE OBJECT-ENGAGEMENT SCANNING SYSTEM AND METHOD, which is hereby incorporated by reference in its entirety.

This application, while not claiming priority to, may be related to U.S. patent application Ser. No. 17/197,516, filed Mar. 10, 2021, and entitled SELF-DRIVING VEHICLE PATH ADAPTATION SYSTEM AND METHOD, published as U.S. Patent Publication 2021/0284198 on Sep. 16, 2021, which claimed priority to U.S. Provisional Application No. 62/987,562, filed Sep. 30, 2020, and U.S. Provisional Application No. 63/085,416, each of which are hereby incorporated by reference in its entirety.

FIELD OF INTEREST

The present inventive concepts relate generally to systems and methods useful to various types of vehicles that need to engage one or more types of objects of interest, e.g., pallets. The inventive concepts herein may be particularly useful in warehouse auto-guided vehicles (AGVs), such as vision guided vehicles (VGVs). The vehicles can be pallet trucks, tuggers, or other types of warehouse vehicles, or other vehicles, that engage an object of interest for transportation.

BACKGROUND

A storage facility is a facility primarily used for storage of goods for commercial purposes, such as a warehouse. The storage is generally intended to be temporary, as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet for transportation, and the warehouse may use pallets as a manner of internally transporting and storing items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse where large trucks pick-up and drop-off goods. The warehouse can also include a staging area—as an intermediate area between shipping and receiving and storage aisles within the warehouse where the goods are stored. The staging area, for example, can be used for confirming that all items on the shipping manifest were received in acceptable condition. The staging area can also be used to build orders and pallets to fulfill orders that are to be shipped.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf. A cart requires a tugger (or "tow tractor"), which enables a user to pull the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand. FIG. 1 provides embodiments of various types of pallets known in the art.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Various types of vehicles exist that can navigate without direct reliance on a human driver, such as autonomous mobile robots (AMRs), automatic guided vehicles (AGVs), vision guided vehicles (VGVs), and autonomous guided carts (AGCs), as examples. For purposes of brevity, such vehicles will be collectively referred to as AGVs. AGV forms of pallet trucks and powered tuggers exist. An AGV is a mobile robot that follows markers or wires in the floor, or uses vision or lasers to make its way without direct or remote control by an operator. They are most often used in industrial applications to move materials around a manufacturing facility or a warehouse, such as in the case of AGV forklifts, pallet trucks, and tuggers.

Pallet trucks (and forklifts) engage, lift and transport pallets using a pair of forks. A pallet truck may travel in reverse to engage and pick up pallets. On AGVs, and VGVs in particular, having sensors to assist the forks in engaging a pallet can be very useful, and some sensing systems currently exist. Locations of such sensors at the fork base (or backplate) can be problematic. The backplate, from which the forks extend, is wider than the fork tips, which are distal to the backplate (fork base). While the backplate offers ample room for the placement of sensors, the backplate presents problems in that the fork bodies can shadow the sensor's view and debris or damaged pallets can block the sensors, presenting false obstructions.

It would be useful to have sensing capability on pallet trucks or other vehicles that enables accurate pallet identification and engagement by the fork tips, or engagement of other types of objects of interest by other types of object engagement apparatuses of a vehicle.

SUMMARY

In accordance with aspects of the inventive concepts, provided is a pallet transport system comprising a drive portion constructed and arranged to facilitate movement of the pallet transport and a load portion comprising a plurality of forks constructed and arranged to engage and carry at least one pallet. The plurality of forks comprises a first fork and a first sensor coupled to or disposed within a first fork tip located at a distal end of the first fork, wherein the first sensor is configured to collect sensor data. The system also includes at least one processor configured to process the sensor data to identify at least one pallet and an orientation of the at least one pallet.

In various embodiments, the first sensor comprises a first scanning LIDAR sensor arranged to generate a first scan plane to collect the sensor data.

In various embodiments, the first scan plane is oriented parallel to a ground plane.

In various embodiments, the plurality of forks further comprises a second fork and a second sensor coupled to or disposed within a second fork tip located at a distal end of the second fork, wherein the second sensor is also configured to collect the sensor data.

In various embodiments, the second sensor comprises a second scanning LIDAR sensor arranged to generate a second scan plane to collect the sensor data.

In various embodiments, the second scan plane is oriented downward toward a ground plane, at a tilt angle below horizontal.

In various embodiments, the first sensor comprises a first scanning LIDAR sensor arranged to generate a first scan plane to collect the sensor data and the first scan plane is oriented parallel to the ground plane.

In various embodiments, the tilt angle is up to 10 degrees from horizontal toward the ground plane.

In various embodiments, the tilt angle is up to about 5 degrees, ±2 degrees, from horizontal toward the ground plane.

In various embodiments, the tilt angle is up to about 3 degrees, ±1 degree, from horizontal toward the ground plane.

In various embodiments, the pallet transport system is an auto-guided pallet truck.

In various embodiments, the at least one processor is configured to perform a coarse fit operation on the scan data and then perform a fine fit operation on the scan data to determine of an object indicated by the scan data is an obstacle or the at least one pallet.

In various embodiments, as part of the course fit operation, the at least one processor is configured to process the scan data to determine a best score with respect to a plurality of stored pallet models.

In various embodiments, as part of the fine fit operation, the at least one processor is configured to iteratively process the scan data to generate a fit score and to compare the fit score against a minimum score threshold related to the stored pallet models to identify at least one pallet when the fit score is above the minimum score threshold.

In various embodiments, in response to identifying at least one pallet and determining an orientation of the at least one pallet, the at least one processor is configured to signal to the drive system to cause the transport system to navigate to align the plurality of forks with the at least one pallet.

In accordance with other aspects of the inventive concepts, provided is a method of determining if an object is a pickable pallet. The method comprises providing a pallet transport system, comprising a drive portion constructed and arranged to facilitate movement of the pallet transport and a load portion comprising a plurality of forks constructed and arranged to engage and carry at least one pallet. The plurality of forks comprises at least one sensor coupled to or disposed within a fork tip of at least one fork, wherein the at least one sensor is configured to collect sensor data representing structures and voids of at least one pallet. The pallet transport also includes at least one processor configured to execute an algorithm to collect and process the sensor data. The method further includes generating at least one scan plane and collecting scan data by the at least one sensor and processing the scan data by the at least one processor to determine if a pallet is present and, if so, to determine if pallet pockets are accessible by the forks.

In various embodiments, the method further comprises using the scan data, determining a degree of rotation of the pallet relative to a travel path of the pallet transport system.

In various embodiments, the method further comprises using the scan data, the drive portion adjusting the travel path of the pallet transport system to adjust to a pallet that is rotated with respect to the travel path so the plurality of forks is aligned with the pallet pockets.

In various embodiments, the method further comprises using the scan data, the at least one processor identifying the pallet from a defined set of pallets.

In various embodiments, the method further comprises using the at least one processor, performing a coarse fit operation on the scan data and then performing a fine fit operation on the scan data to determine of an object indicated by the scan data is an obstacle or the at least one pallet.

In various embodiments, the course fit operation comprises processing the scan data to determine a best score with respect to a plurality of stored pallet models.

In various embodiments, the fine fit operation comprises iteratively processing the scan data to generate a fit score and comparing the fit score against a minimum score threshold related to the stored pallet models to identify at least one pallet when the fit score is above the minimum score threshold.

In accordance with aspects of the inventive concepts, provided is a pallet transport system, comprising a drive portion constructed and arranged to facilitate movement of the pallet transport and a load portion constructed and arranged to couple with a pallet. The load portion comprises a first fork and a first sensor coupled to or disposed within a fork tip located at a distal end of the first fork, wherein the first sensor is at least a 2D sensor.

In various embodiments, the first sensor comprises a scanning LIDAR sensor arranged to collect information from a first scan plane.

In various embodiments, the load portion further comprises a second fork and a second sensor coupled to or disposed within a fork tip located at a distal end of the second fork.

In various embodiments, the second sensor comprises a scanning LIDAR sensor arranged to collect information from a second scan plane.

In various embodiments, the first scan plane is oriented parallel to a ground surface.

In various embodiments, the second scan plane is oriented parallel to the ground surface.

In various embodiments, the second scan plane is oriented toward the ground surface, at a tilt angle below horizontal.

In various embodiments, the tilt angle is up to 10 degrees from horizontal toward the ground plane.

In various embodiments, the tilt angle is up to about 5 degrees, ±2 degrees, from horizontal toward the ground plane.

In various embodiments, the tilt angle is up to about 3 degrees, ±1 degree, from horizontal toward the ground plane.

In various embodiments, the pallet transport is an AGV of VGV pallet truck.

In accordance with aspects of the inventive concepts, provided is a pallet localization method, comprising the steps of providing a pallet transport system in accordance with any of claims 1 through 11; using a scanner in the first and or second fork tips, generating at least one scan plane and collecting scan data; and processing the scan data to determine if a pallet is present and, if so, one or more fork openings in the pallet.

In various embodiments, the method can further comprise using the scan data, determining a degree of rotation of the pallet relative to a travel path of the pallet transport.

In various embodiments, the method can further comprise using the scan data, adjusting the travel path of the pallet transport to adjust to a pallet that is rotated with respect to the travel path.

In various embodiments, the method can further comprise using the scan data, identifying the pallet from a defined set of pallets.

In accordance with aspects of the inventive concepts, provided is a transport vehicle, comprising a drive portion constructed and arranged to facilitate movement of the transport vehicle and a load portion constructed and arranged to engage an object of interest. The load portion comprises at least one object engagement apparatus and a first sensor coupled to or disposed within a distal end of the at least one object engagement apparatus, wherein the first sensor is at least a 2D sensor.

In accordance with aspects of the inventive concepts, provided is a localization method, comprising the steps of providing a transport vehicle in accordance with any of claim 16, using a scanner in the at least one object engagement apparatus, generating at least one scan plane and collecting scan data, and processing the scan data to determine if an object of interest is present and, if so, determining one or more engagement portions of the object of interest.

In various embodiments, the method can further comprise using the scan data, determining an orientation and/or degree of rotation of the object of interest relative to a travel path of the transport vehicle.

In various embodiments, the method can further comprise using the scan data, adjusting the travel path of the transport vehicle to adjust to the object of interest if it is rotated with respect to the travel path.

In various embodiments, the method can further comprise using the scan data, identifying the object of interest from a defined set of objects of interest.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings:

FIGS. 2A and 2B proved a top view and a side view, respectively, of a pallet transport system or vehicle, in accordance with aspects of the inventive concepts;

FIGS. 3A-3B are views of embodiments of fork tips with planar scanners, in accordance with aspects of the present inventive concepts;

DESCRIPTION

Figure 1:
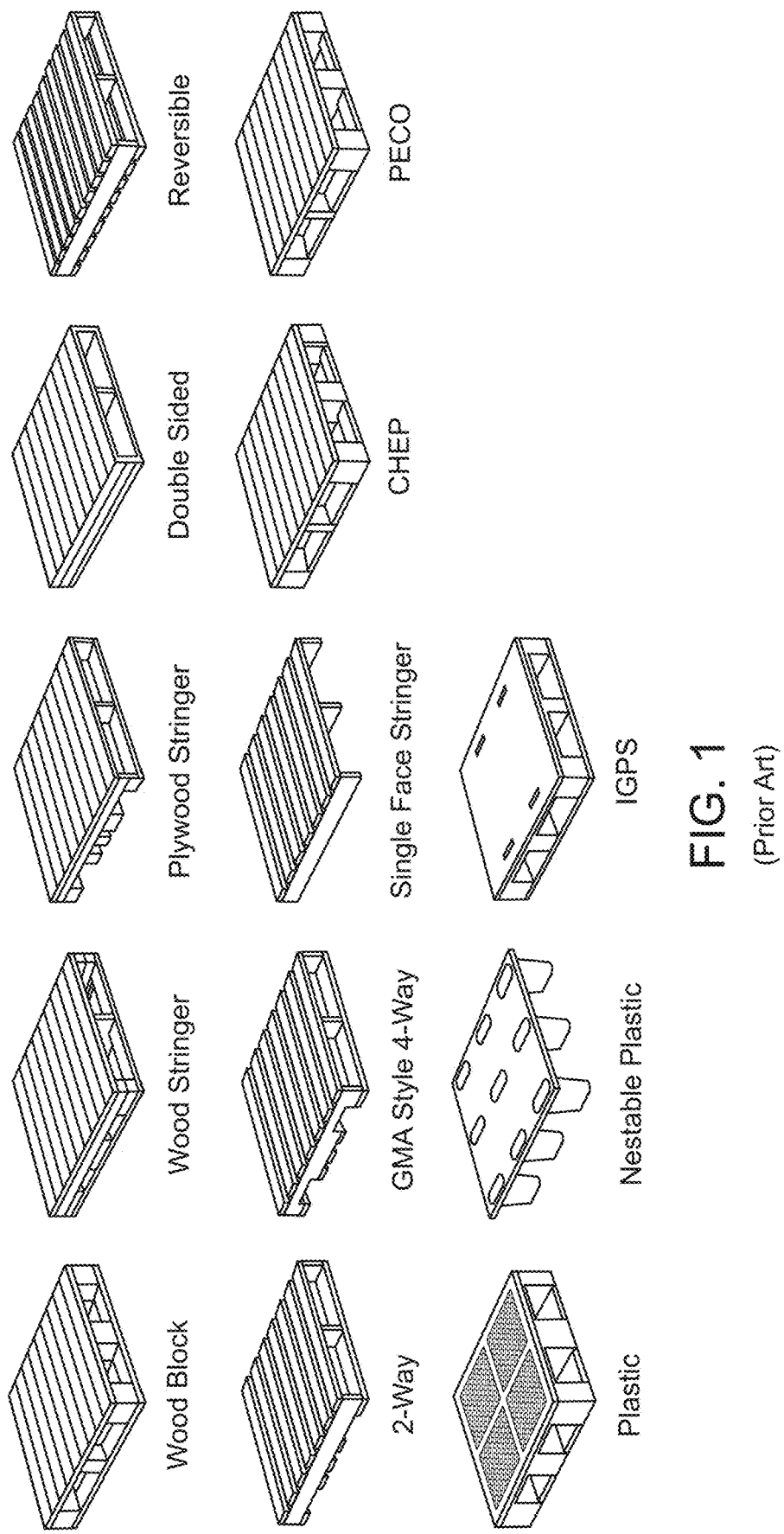
FIG. 1 shows examples of various types of prior art pallets.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with aspects of the inventive concepts, provided is a sensor system that is useful for enabling a vehicle to engage an object to be transported by the vehicle. The sensor system can be an onboard sensor system, coupled to or forming part of the vehicle. In various embodiments, the sensor system can collect sensor data useful to a navigation system to guide the vehicle to engage the object.

FIGS. 2A and 2B provide a top view and a side view, respectively, of an embodiment of a transport system 100, in accordance with aspects of the inventive concepts. In various embodiments, the transport system 100 can be or take the form of an auto-guided vehicle (AGV), such as vision-guided vehicle (VGV), as examples. In some embodiments, the transport system can be an AGV/VGV pallet transport system 100, such as a GP8 Automated Pallet Truck made by Seegrid Corporation, configured with object sensing technology in accordance with aspects of the inventive concepts.

In an embodiment, the transport system 100 comprises an object engagement apparatus 20 for lifting and carrying and/or pulling one or more payloads, such as at least one pallet or skid. In this embodiment, the object engagement apparatus 20 comprises a pair of folks 30. In alternative embodiments, the object engagement apparatus 20 can comprise a different type of apparatus for engaging a load. In some embodiments, each fork 30 comprises at least one fork wheel 35, and the forks can be selectively raised and lowered while the wheels remain on the ground surface during transport.

In various embodiments, such as the one shown in FIGS. 2A and 2B, the transport system 100 includes at least one sensor 40 having at least one sensor element 44, as described herein. The at least one sensor 40 can be configured to acquire sensor and/or scanner data useful in positioning the object engagement apparatus 20 to engage the object, e.g., a pallet. The at least one sensor 40 can communicate with a navigation system of the transport system 100 to provide sensor/scanner data useful to detect an object to be engaged and navigate the object engagement apparatus 20 to the object.

In this embodiment, the transport system 100 comprises a drive portion 50 constructed and arranged to facilitate movement of the transport system. In various embodiments, the drive portion 50 can include at least one motor, computer processor, navigation system, and wheels. In various embodiments, such as in AGV/VGV embodiments, the navigation system can be configured to control the drive portion 50.

The transport system 100 can include a load portion 10 constructed and arranged to engage and maintain an object of interest to be transported, e.g., one or more pallets. In various embodiments, the load portion 10 can comprise the object engagement apparatus 20 and the at least one sensor 40 or sensor elements thereof. In the embodiment shown, the object engagement apparatus 20 is or includes a pair of forks 30. In this embodiment, the pair of forks 30 includes forks 30a, 30b.

The at least one sensor 40 can be arranged to sense and/or detect objects to be engaged by the object engagement apparatus 20, e.g., forks 30. The at least one sensor 40 can include one or more sensor elements 44 that are integral with or from part of the object engagement apparatus 20. For example, in some embodiments, the at least one sensor 40 can include one or more sensor elements 44 integral with or forming part of one or more of the forks 30. Therefore, in various embodiments, the object engagement apparatus 20, or forks 30, can comprise one or more sensors 40 and or one or more sensor elements 44 configured and arranged to sense the object to be engaged, its orientation, and/or portions thereof. For example, the forks 30 can include one or more sensors 40 or sensor elements 44 configured and arranged to sense the presence and/or orientation of a pallet to be engaged, or portions thereof, by the transport system 100.

FIGS. 3A and 3B are perspective views of embodiments of fork tips 34 of the forks comprising planar sensor/scanners 40, in accordance with aspects of the present inventive concepts. FIG. 3A shows two fork tips 34a, 34b, each including a sensor/scanner 40a, 40b with respective sensor/scanner elements 44a, 44b. In alternative embodiments, only one fork tip 34 comprises a sensor 40 or sensor/scanner element 44. In alternative embodiments, one or more forks 30 can comprise more than one sensor 40 or sensor/scanner element 44. That is, a plurality of sensors 40 and/or sensor/scanning elements 44 can be disposed in or distributed among a plurality of forks.

FIG. 3B shows an embodiment of a single fork tip 34 with a sensor 40 and sensor/scanner element 44. In this embodiment, the sensor/scanner element 44 is a planar scanner. In some embodiments, only one fork tip 34 includes a planar scanner. In other embodiments, both fork tips 34 include a planar scanner. In still other embodiments, the transport system 100 could include one or more sensors 40 located in or on other parts of the transport system.

In various embodiments, the first fork 30a includes the first sensor 40a coupled to or disposed within fork tip 34a at a distal end of the first fork. Similarly, the second fork 30b includes the second sensor 40b coupled to or disposed within a fork tip 34b at a distal end of the second fork 30b. In some embodiments, the at least one sensor 40a, 40b can be at least one two-dimensional (2D) sensor. In some embodiments, the at least one sensor 40a, 40b can be at least one three-dimensional (3D) sensor. In various embodiments, the at least one sensor 40 can comprise at least one 2D sensor and at least one 3D sensor. In some embodiments, the at least one sensor 40 can include a plurality of sensors and/or a plurality of sensor types, including 2D sensors and/or 3D sensors.

Therefore, in some embodiments, the transport system 100 comprises at least one sensor 40 having at least one sensor/scanner element 44 coupled to or disposed within a fork tip 34 of one or both of the forks 30. The fork tip 34 is distal from a fork base 32 and a backplate 36 of the pallet transport 100, as shown in FIGS. 2A and 2B.

In some embodiments, at least one sensor 40 is configured and arranged to provide information about objects within the sensor's field of view. In some embodiments, the at least one sensor 40, and/or and at least one of its sensor/scanner elements 44, is configured to output a data stream that can be processed by and integrated with other data from other sensors of a navigation system, such as described in US Patent Publication 2021/0284198, published Sep. 16, 2021, which is incorporated by reference. In some embodiments, the transport system 100 can integrate data from the at least one sensor 40 and at least one of its sensor/scanner elements 44 to determine if a path of the transport system 100 is likely to intersect with an object and, if so, the navigation system can be configured to halt or otherwise alter the transport system's motion in response, at least in part, to data from the sensor/scanner elements 44 of the at least one sensor 40.

In some embodiments, at least one sensor/scanner element 44 can comprise or take the form of at least one scanning LIDAR that is packaged to fit into and within the fork tip 34 of a fork 30, distal from the fork base 32 and the backplate 36. The at least one scanning LIDAR 44 can be configured to provide a distance measurement to any object within its field of view, e.g., an object to be engaged. In some embodiments, the at least one sensor 40 provides much better flexibility in detecting, reacting to, and adapting to objects in the transport system's 100 travel path as it navigates to engage an object, for example. This increased capability ultimately increases efficiency and decreases overall warehouse costs.

In addition to obstruction or object sensing, in some embodiments, one or more of the sensors 40 can also provide data when the transport system 100 is backing down a lane to pick up a payload to determine the distance to the payload and allow the transport system 100 to be smarter and more capable in engaging a payload (e.g., picking up a palletized payload) that is positioned at ambiguous locations or angles relative to a travel path of the transport system 100. Previously, AGV/VGV pallet trucks, as an example, could only engage payloads (e.g., pallets) located at a specific spot and/or orientation, but the inventive concepts herein provide a more flexible approach to backing down a long lane and locating and adapting to the load (e.g., pallet) for engagement.

In some embodiments, the at least one sensor 40, can also provide data that is useful for arranging one or more payloads into lanes. In some embodiments, the at least one sensor 40, can provide data to identify the nearest element in a given lane so that a payload can be positioned nearby.

Accordingly, in some embodiments, the transport system 100 is an AGV/VGV pallet transport that can include one or more sensors 40 in the form of scanners 44 coupled to or disposed within a distal end 34 of the one or more forks 30. When there is a plurality of sensor/scanner elements 44, different sensor/scanner elements can be oriented at different pitch angles relative to a ground plane or surface (e.g., at least one level and at least one tilted slightly down) to provide better visibility in both forks up and forks down positions and/or operations.

Referring again to FIG. 2B, the first scanner 44a is directed relatively level, or about horizontal relative to a ground plane or surface, and shown by the first scanning beam 1102. Additionally, the second scanner 44b is directed downward relative to horizontal, toward the ground plane or surface, and shown by the second scanning beam 1104. In such an embodiment, the first and second scanner elements 44, in the first and second fork tips, direct their respective scanning beams are different angles relative to the ground plane. Since the forks can be in a raised position for travel when carrying a load or in a lowered position for engaging a pallet or traveling without a load, having a plurality of scanner elements directed at different angles relative to the ground plane enables detection of objects on the ground whether the forks are raised or lowered.

In some embodiments, the at least one sensor 40 and/or transport system 100 process data from the sensor/scanner elements 44 to detect pocket locations of a pallet. A "pocket" or "pocket opening" is an opening in the pallet configured to receive a fork. FIG. 1 provides examples of existing types of pallets. Pallets of different types tend to have two fork pockets configured to receive the two forks 30 of the transport system 100. In various embodiments, the at least one sensor 40 can be configured to detect any of the types of pallets listed FIG. 1, as examples. In various embodiments, the at least one sensor 40 can be configured to detect other types of payloads, e.g., carts.

In some embodiments, an AGV/VGV with fork tip sensing and scanning utilizes planar sensor/scanner elements, e.g., BEA LZR-FLATSCAN scanners from BEA Americas, or similar sensors/scanners, for determining pallet and skid positions and pocket locations when such sensor/scanner elements 44 are mounted in the fork tips 34 of an AGV/VGV pallet jack. In various embodiments, other laser scanning systems that generate a scanning plane can be used, e.g., a laser flat scanner producing a single curtain.

In accordance with aspects of the inventive concepts, an AGV/VGV transport system with fork tip scanning can detect the locations and/or orientations of 'pickable' pallets, defined by an x, y, and theta relative to the fork tips. 'Pickable' can be construed as a pallet in the direct vicinity behind the forks with the pocket openings facing generally towards the forks, e.g., having an orientation of up to about +/−45 degrees relative to the travel path of the transport system 100. Given an environment without a pickable pallet, no pallet is detected. Although, a pallet oriented outside an acceptable range of rotation with respect to the drive or travel path of the vehicle could be detected as an obstacle, rather than a pickable pallet. In various embodiments, when a pallet is detected, the sensors can distinguish between obstacles and pallets in the environment. In various embodiments, the transport system 100 having the at least one sensor 40 is not limited to a Boolean path obstructed/not-obstructed signal and can be configured to determine actual positions of obstructions through processing of the sensor data, allowing more complex muting of other sensors, e.g., safety system sensors, when approaching a pallet or determining a pallet drop-off location, e.g., during lane building.

Figure 6A:
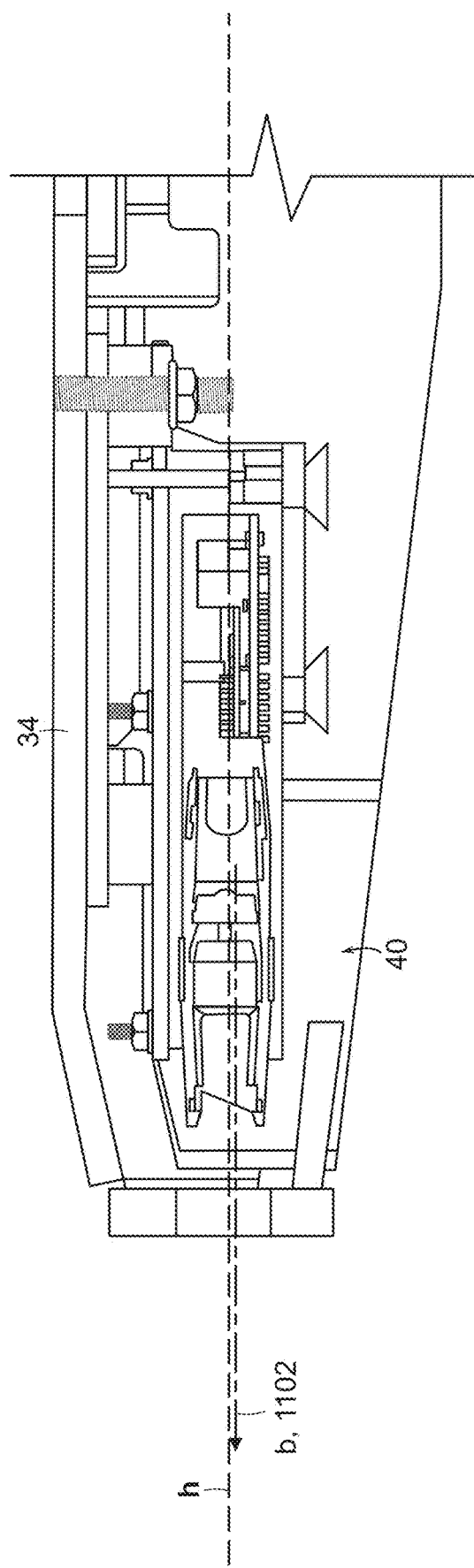
FIGS. 6A-6B are views of embodiments of internal components of fork tips with planar scanners from a side view, in accordance with aspects of the present inventive concepts.

In some embodiments, one or both of the fork tips can include at least one planar sensor/scanner element 44 oriented to have a scan plane 1102 substantially parallel to a ground plane (or ground surface), e.g., see FIGS. 2B and 6A. In some embodiments, one or both of the fork tips can include at least one planar sensor/scanner oriented downward, to have a scan plane 1104 sloping toward the ground at a tilt angle, e.g., see FIGS. 2B and 6B. In some embodiments, one fork tip has a planar sensor/scanner with a scan plane 1102 oriented substantially parallel to the horizontal ground plane and the other fork tip has a planar sensor/scanner that has or can have a scanning plane 1104 sloping toward the ground surface at a tilt angle.

In some embodiments, the tilt angle can be up to about 10 degrees from horizontal toward the ground surface or plane, or up to about −10 degrees from horizontal, which is a plane at the height of the sensor/scanner element that is parallel to the ground plane. In some embodiments, the tilt angle can be up to about −5 degrees±2 degrees, relative to horizontal and toward the ground plane. In some embodiments, the tilt angle can be up to about 3 degrees±1 degree, relative to horizontal and toward the ground plane.

In some embodiments, a planar sensor/scanner element 44 can have a fixed orientation with respect to the ground plane, whether horizontal or tilted, within its fork tip 34. In some embodiments, one or both fork tips 34 can include a planar scanner element 44 that can transition between a horizontal orientation and a tilted orientation with respect to the ground plane. In such cases, one or more sensors 40 or sensors/scanner elements 44 can be rotatable within the fork tip, e.g., to rotate between the horizontal and toward the ground plane at a prescribed tilt angle.

In various embodiments, each sensor 40 can be a sensor unit having a sensor/scanner secured within and/or by a package or housing. In various embodiments, the sensor package is configured to fit inside a fork tip 34.

Figure 4:
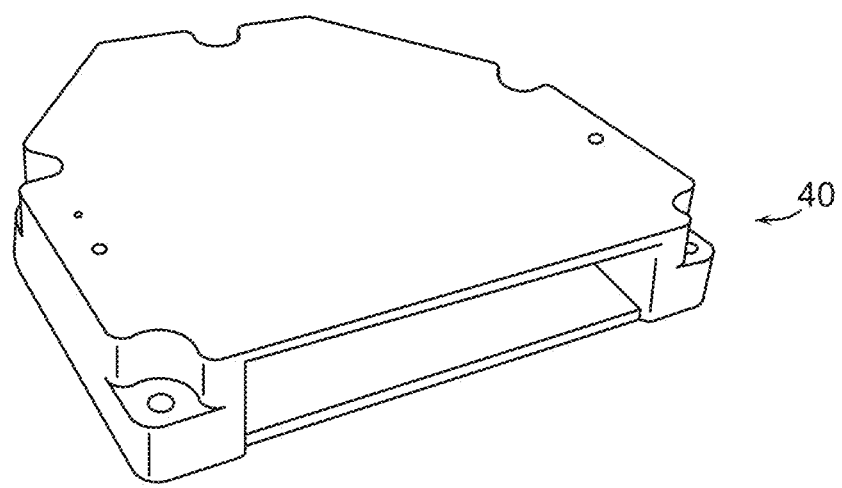
FIG. 4 is a perspective view of an embodiment of a fork-tip scanner housing, in accordance with aspects of the present inventive concepts.

FIG. 4 is a perspective view of an embodiment of a fork-tip scanner housing 42, in accordance with aspects of the present inventive concepts. The housing 42 is configured to receive and maintain at least one laser sensor/scanner element 44 as described herein, e.g., a BEA LZR-FLATSCAN scanner. The housing 42 has a low profile so that it can be installed and secured within a fork tip 34. In alternative embodiments, the housing 42 can be configured such that it can be coupled to an exterior surface of a fork. The housing 42 can be made of a durable material, such as a plastic or the like, and constructed and arrange to secure and protect the sensor/scanner and its electronics inside the fork tip. In some embodiments, the housing 42 can provide and closed space for the sensor/scanner element 44. In some embodiments, the housing can provide and airtight and/or water tight volume for the sensor/scanner element 44.

Figure 5B:
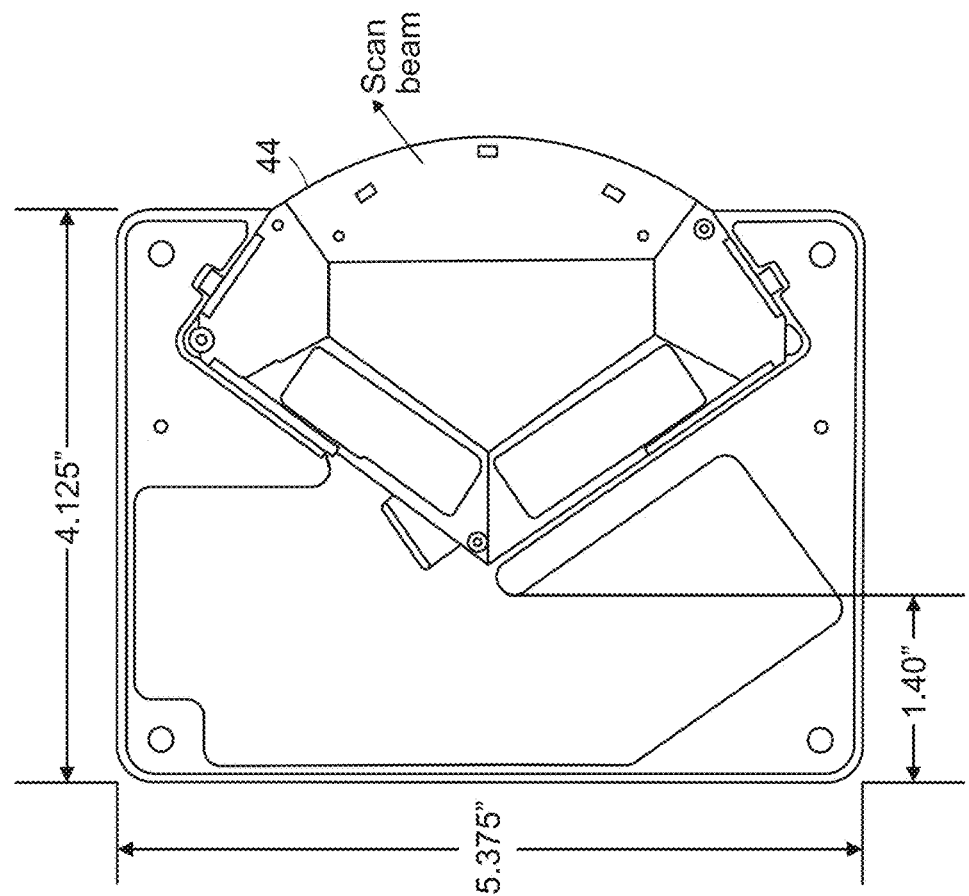
FIGS. 5A-5B are views of embodiments of internal components of fork tips with planar scanners, in accordance with aspects of the present inventive concepts.
Figure 5A:
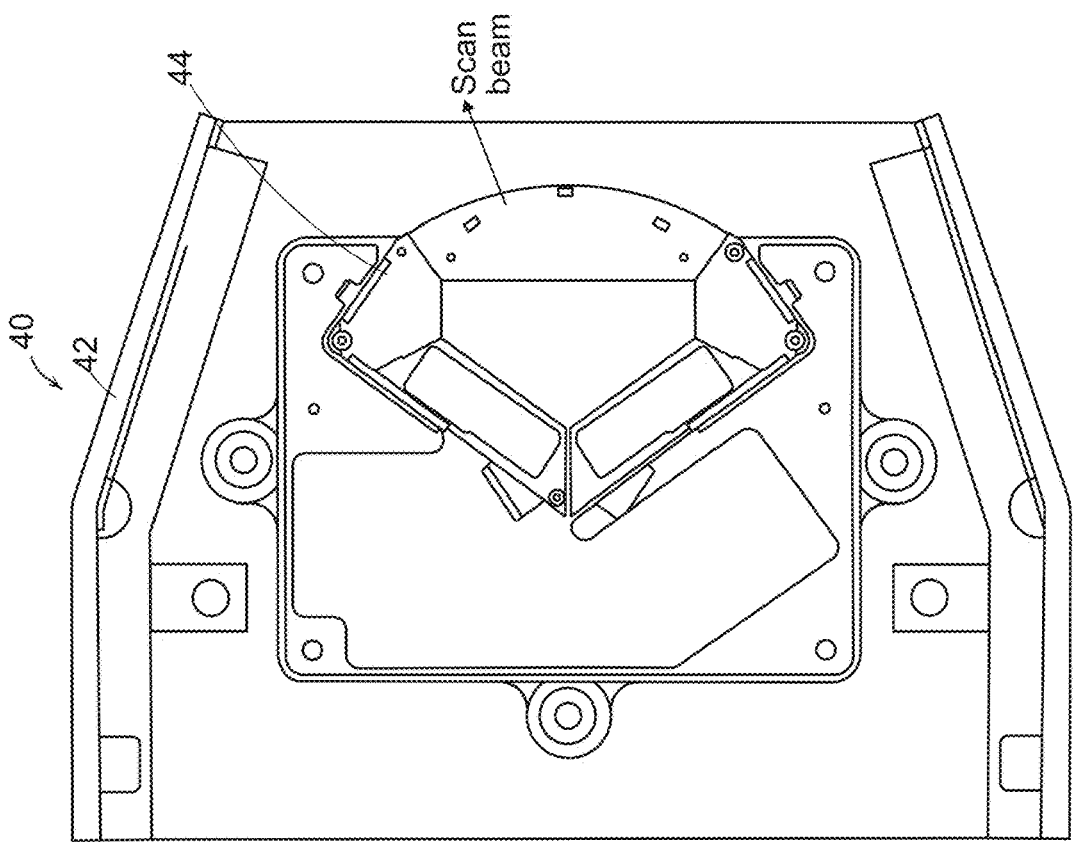

FIGS. 5A-5B are top views of embodiments of internal components of a fork tip 34 with planar sensor/scanners 44, in accordance with aspects of the inventive concepts. In particular, FIG. 5A shows the sensor 40 comprising a semi-opaque top view of the housing 42 of FIG. 4 with the laser scanner element 44 disposed therein.

As is shown in FIGS. 4 and 5A, the housing 42 is shaped to fit within the fork tip 34. In alternative embodiments, the housing 42 can be configured such that it can be coupled to an exterior surface of a fork 30.

FIG. 5B shows an embodiment of the laser scanner element 44 alone. In some embodiments, the laser scanner element 44 has dimensions of 4.125 inches by 5.375 inches. In alternative embodiments, the laser scanner element 44 can have different dimensions.

The laser scanning element 44 produces a scan beam that rotates back and forth creating a scan plane. In some embodiments, the laser scanner element 44 includes a laser that rotates about an axis that is about is 1.40 inches from the rear of the laser scanning element. The laser scanning element 44 can also include electronics (not shown) configured to deliver power to and control the laser.

Figure 6B:
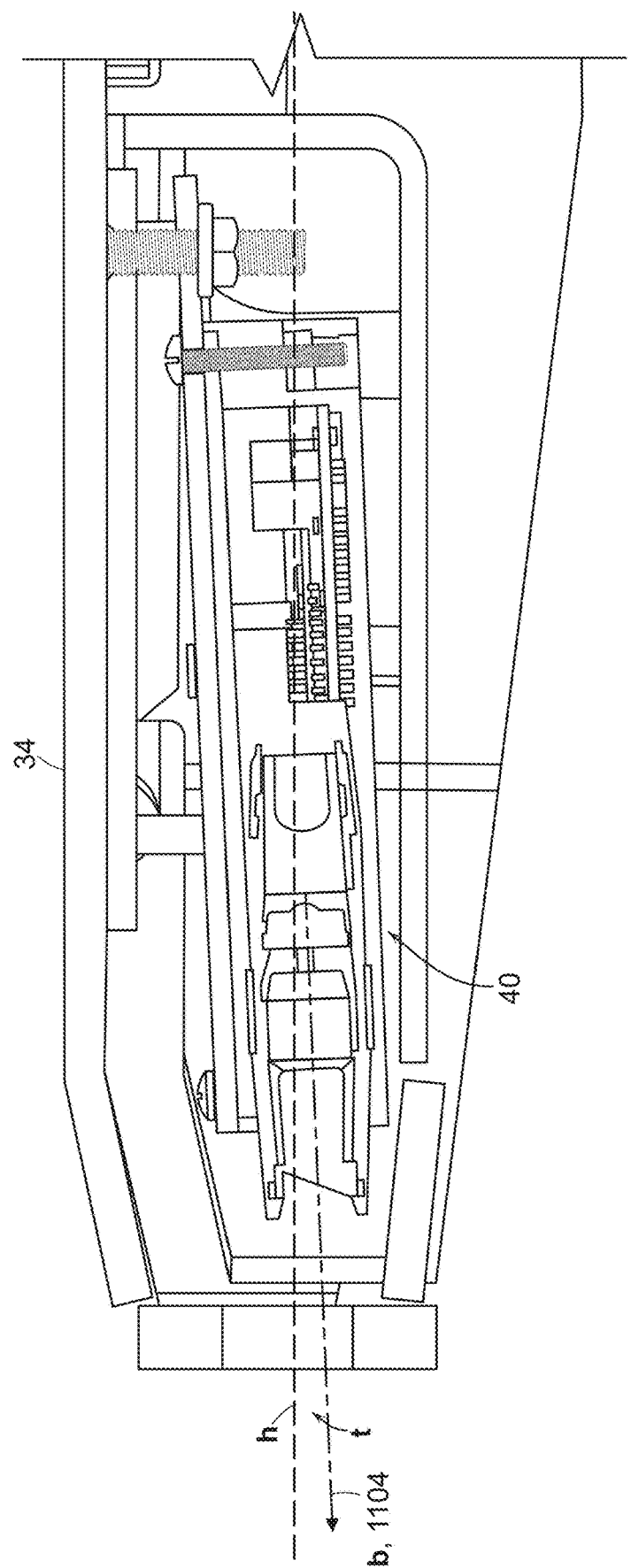

FIGS. 6A-6B are side views of an embodiment of internal components of fork tips with sensor 40 therein, in accordance with aspects of the present inventive concepts. In particular, FIG. 6A shows the sensor 40, comprising housing 42 and laser scanner element 44, within the fork tip 34 and oriented to project a rotating scan beam b that forms a scanning plane 1102 that is substantially horizontal to a ground plan.

FIG. 6B shows the sensor 40 oriented to project a scan beam b to form a scanning plane 1104 toward the ground surface, at a tilt angle t from horizontal h.

Figure 7:
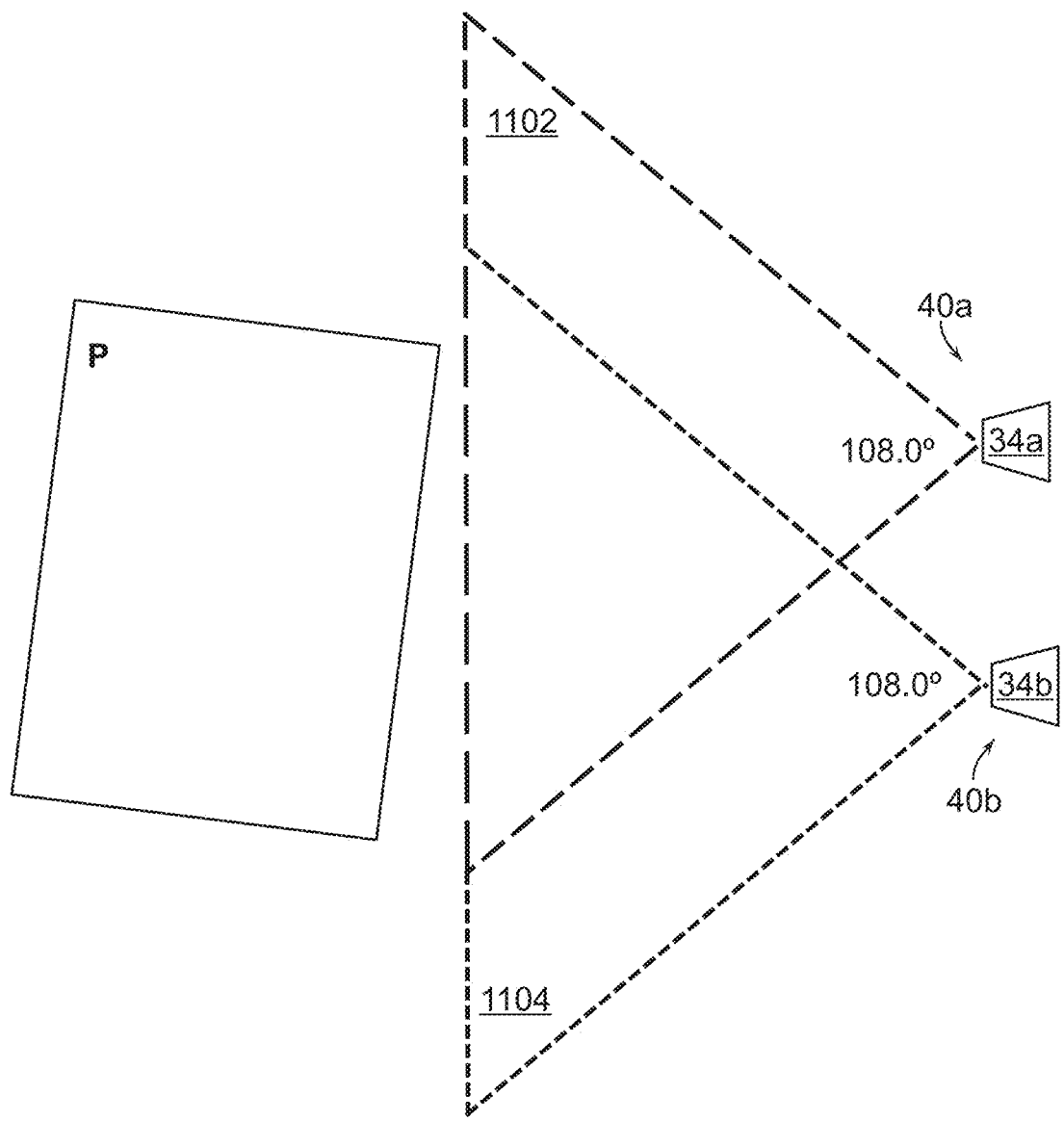
FIG. 7 is a diagram depicting an embodiment of scanning planes of the fork tip scanners, in accordance with aspects of the present inventive concepts.

FIG. 7 is a diagram depicting a top view of an embodiment of scanning planes 1102, 1104 produced by the fork tip scanners 40, in accordance with aspects of the present inventive concepts. In this embodiment, each fork 30 includes at least one sensor (scanner) 40, or fork tip scanner 40. The fork tip scanners 40 can be configured to produce overlapping scanning planes 1102, 1104, which can be used to detect a pallet P. In this embodiment, each scanner produces a scanning plane with a sweep of 108 degrees. In other embodiments, the sweep can be different, i.e., less or more than 108 degrees. For example, in some embodiments, for one or more scanners, the scan sweep can be at least about 90 degrees and up to about 180 degrees. In other embodiments, the scan sweep can be different. In some embodiments, scanners on both forks have the same scan sweep, but in other embodiments they can have different scan sweeps.

In alternative embodiments, the transport system 100 comprises one or more 3D sensor/scanner elements. In such embodiments, the one or more 3D sensors/scanners can produce a three-dimensional image of a space. In some embodiments, this three-dimensional image information acquired can be used detect and locate pallets. In some embodiments, this three-dimensional image information acquired can be used to detect and locate 'pickable' pallets, as described earlier. In some embodiments, this three-dimensional image information acquired can be integrated with and used by a navigation system of the transport system 100. One or more 3D sensors/scanners can be used or arranged in any of the configurations described herein in combination with a 2D scanner, in some embodiments.

Figure 8:
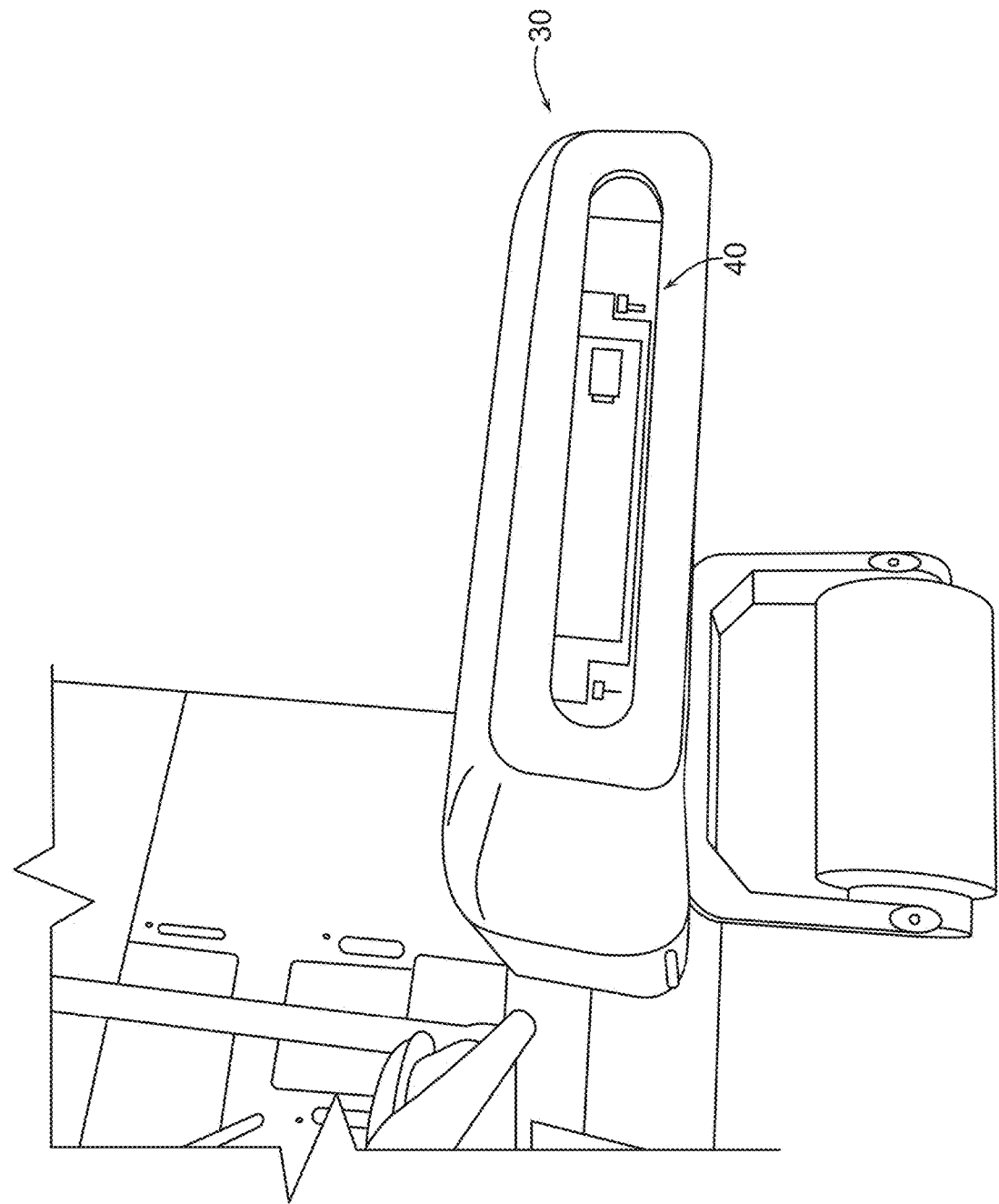
FIG. 8 is a view of an embodiment a fork tip with a planar scanner in a raised position, in accordance with aspects of the present inventive concepts.

FIG. 8 is a view of an embodiment of a fork 30 in a raised position where the fork tip 34 comprises a fork tip sensor/scanner 40, in accordance with aspects of the present inventive concepts.

Figure 9:
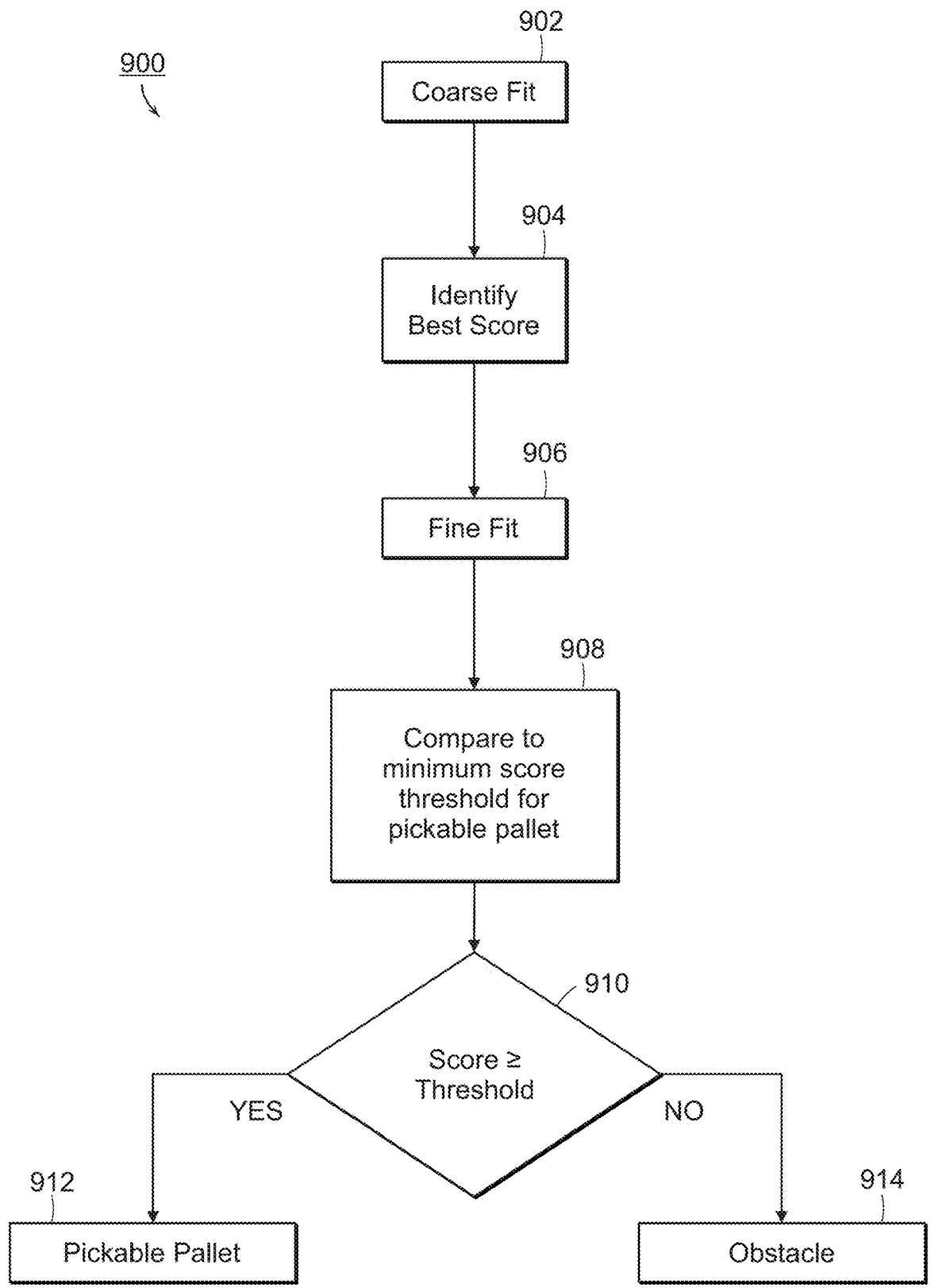
FIG. 9 shows an example of an algorithm for identifying a pickable pallet using the above-described scanners, in accordance with aspects of the present inventive concepts.

FIG. 9 shows an example of method 900 for identifying a pickable pallet by a transport system 100 using sensors/scanners 40, in accordance with aspects of the present inventive concepts. To accomplish the method, computer program code embodying an algorithm can be stored in memory of the sensor 40 and/or the transport system 100. The sensor 40 and/or the transport system 100 can further include at least one processor configured to execute the computer program code to carry out the method.

In some embodiments, the method 900 assumes that the sensor/scanner element 44 emits a scan beam b. The scanner sweeps the scan beam b through a scan range. In some embodiments, the scan beam sweeps through a two-dimensional plane. In alternate embodiments, the scan beam sweeps through a three-dimensional space. The sensor/scanner 40 detects one or more corresponding signals that are reflected and/or diffracted back to the sensor/scanner and/or emitted from objects in the scanner's field of view and measures a "point" at the location from which the sensor determines that the signal was reflected and/or diffracted and/or emitted. The sensor/scanner determines a distance and angle for the point. This information can be stored as scan or object information.

In some embodiments, the algorithm accesses one or more models of objects to be engaged, e.g., pickable pallets. In some embodiments, a database of pallet models can be used to assess the data collection from the sensor/scanners. For example, the pallet models could include a digital model for each pallet in FIG. 1. Ultimately, the transport system 100 having one or more sensor/scanner 40 compares the collected sensor data to the models to see if there is a fit. A fit can mean that the collected sensor data is consistent with the digital data representing a pallet beyond a threshold measure of fit.

In the collected sensor data, a positive region (physical structures) is indicated by a reflected signal and a negative region (void or pallet pockets) can be indicated by the absence of a reflected signal. The absence of a reflected signal can mean no reflection or a reflection signal magnitude below a threshold. The existence of a reflected signal can be a reflection signal magnitude above a threshold. A pallet model represents the physical structures (positive regions) of the pallet as well as its pallet pockets (voids or negative regions).

In various embodiments, the algorithm can implement a coarse fit operation first, to narrow the perspective pallet models, and then a fine fit operation to hone in on a specific pallet model from the subset yielded by the coarse fit. In other embodiments, the algorithm need not use a coarse fit and then fine fit. In some embodiments, the algorithm could continually collect data until a sufficient match can be made with a pallet model, without narrowing in a coarse fit step.

In some embodiments, a fitting algorithm uses a weighted inlier test. In some embodiments, the algorithm assumes that pallet detection is a two-dimensional problem. In some embodiments, the algorithm assumes the sensor is parallel to the ground plane and positioned on center with the pallet. In some embodiments, the pallets are generalized into regions from which the sensors are expected to detect a signal (e.g., sides, fronts of stringers, and blocks) and regions from which the sensors are not expected to detect a signal (e.g., the fork pockets of pallets).

Figure 10:
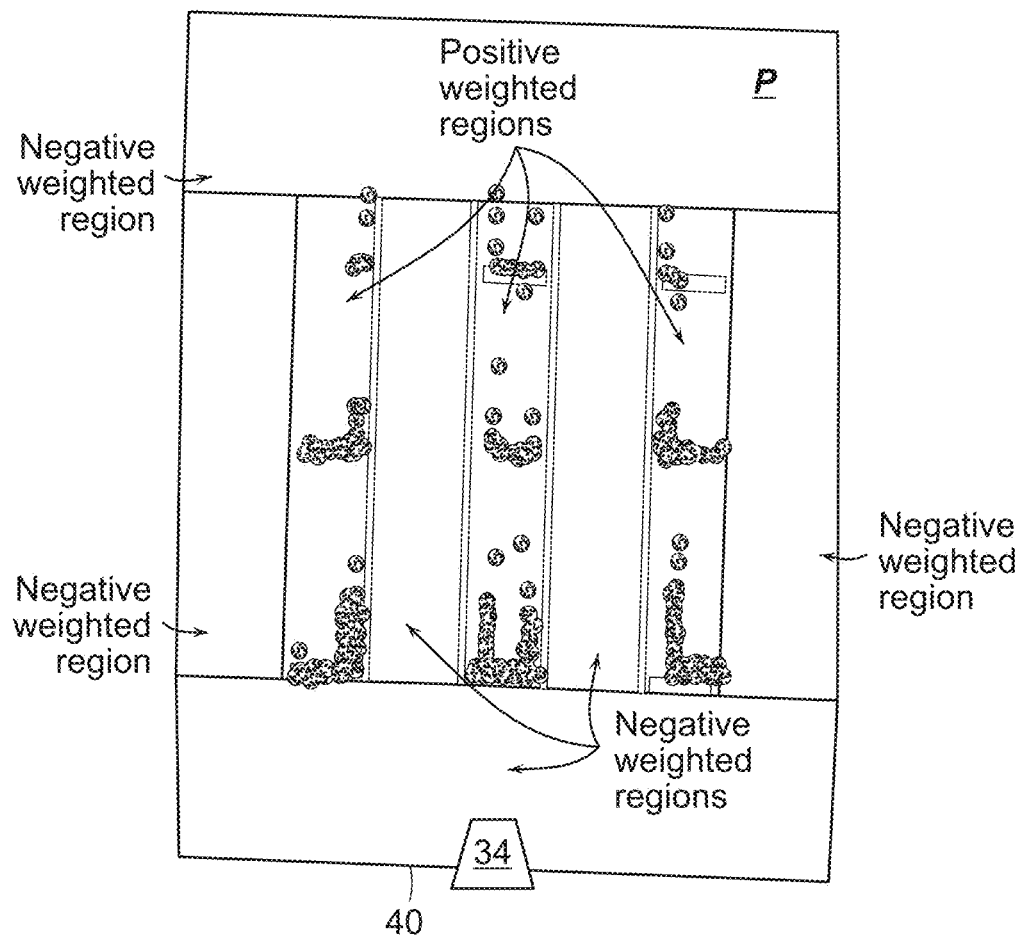
FIG. 10 shows data acquired from an embodiment of a sensor positioned near a pallet, in accordance with aspects of the present inventive concepts.

For the negative regions, the algorithm does not expect to see scan data points; this can be consistent across all pallet types as they are driven by the pallet fork geometry which is constant (see FIG. 10). Because of this, in some embodiments, points from a negative region are weighted more than points from a positive region. In some embodiments, the points from the negative regions are weighted five times more than the points from the positive regions. In alternative embodiments, the negative regions can be weighted by a different amount. In various embodiment, therefore, the algorithm primarily looks for negative regions representing pallet pockets that can receive the forks 30.

In some embodiments, another consideration with the algorithm is the concentration of points in the forward direction of the pallet. In some situations, because of the geometric configuration of the scanners in relationship to the pallet, the front geometry of the pallet obscures the access to the back of the pallet. In some situations, the sensors measure a higher density of points towards the front of the pallet due to the polar scanning nature of the scanners. The spreading nature of the scanners creates a lower point density further from the scanners.

In some embodiments, to prevent a forward bias of the fitting and mitigate the effects of the issues previously mentioned, signals can be weighted by their distance from the expected front of the pallet. In some embodiments, this means a point at the far back of the pallet would have some multiple (e.g., ×24) weight of point on the front face of the pallet. In alternative embodiments, the weight can be different.

Referring to FIG. 9, in some embodiments, the algorithm 900 initially uses a 'brute force' coarse fit approach, step 902, as mentioned above. In such embodiments, the algorithm 900 steps through an entire scan range, transforms scan data into points, and scores the points based on the algorithm, and then tracks and identifies the best score with respect to the pallet models, step 904. Once the best score from the coarse fit is found, it is fed into the fine search portion of the algorithm, in step 906. The fine fit search is iterative where it continues to step over a much smaller range at smaller steps. The process continues as long as the resulting score continues improving. The result then of the fine search is compared against a minimum score threshold related to the stored models, in step 908. If, in step 910, the geometry found is a 'pickable' pallet, the algorithm signals to the transport system to engage the pallet in step 912. Otherwise, the algorithm indicates that the object is an unrecognized geometry and it would be treated as an obstacle, in step 914.

In various embodiments, polygons are transformed into points, as opposed to transforming points to polygons, for the inlier test. This reduces resources need to perform the inlier test, yielding faster scoring.

In alternative embodiments, the algorithm can filter out points that are not within the possible extents of the region of interest, then randomly select points and treat them as a pallet face (statistically points are most likely to be on a pallet face due to the higher point density mentioned above). This would save from iterating over areas that do not contain points.

Because, in various embodiments, regions are analyzed, instead of a line or point approach, there exist ranges where the algorithm could score a fit approximately the same. For example, the stringers of a stringer pallet fit within the regions we expect to see, so some left to right shifting can occur without scoring improvements. To address this, in some embodiments, the algorithm best-fits a line to the front of pallet, and uses a least mean squares fit to get it as closely fit to the points as possible. Also, in some embodiments, the algorithm scores the symmetry of the pallet from left to right. In some embodiments, a C++ implementation and some straightforward parallelization during scoring are used to increase the speed of the algorithm.

FIG. 10 shows data acquired from an embodiment of a sensor positioned near a pallet, in accordance with aspects of the inventive concepts. The image is an overhead view with at least one sensor/scanner 40 located near the bottom of the image. A representation of the pallet P has been shown together with the data. Positively weighted regions and negatively weighted regions are labeled accordingly.

Figure 11A:
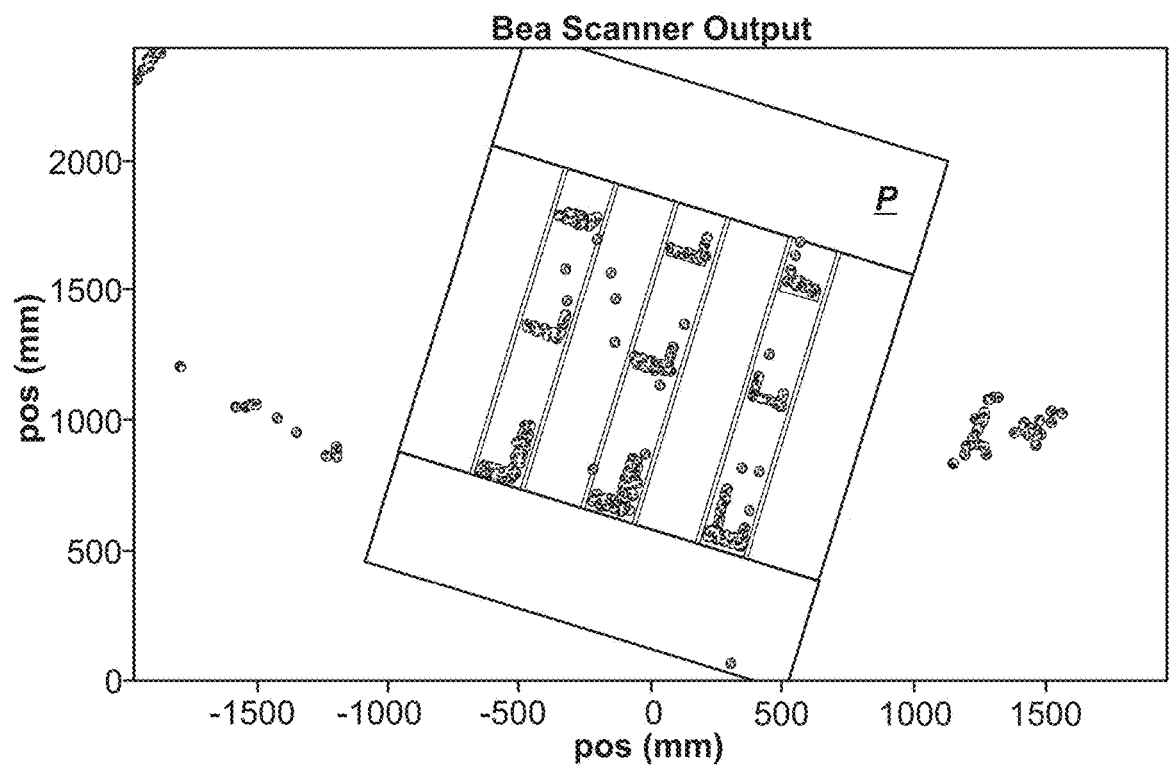
FIGS. 11A-11Q show data acquired from an embodiment of a sensor positioned near a pallet, in accordance with aspects of the present inventive concepts.
Figure 11B:
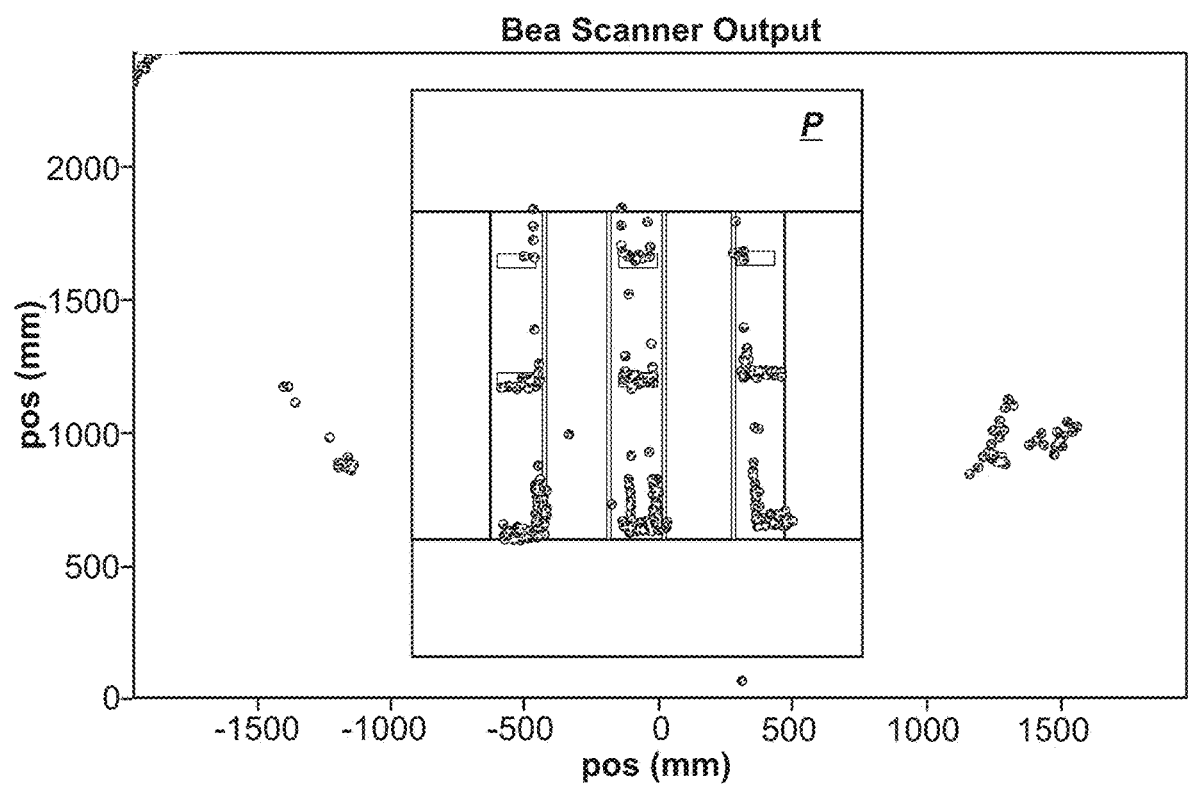
Figure 11C:
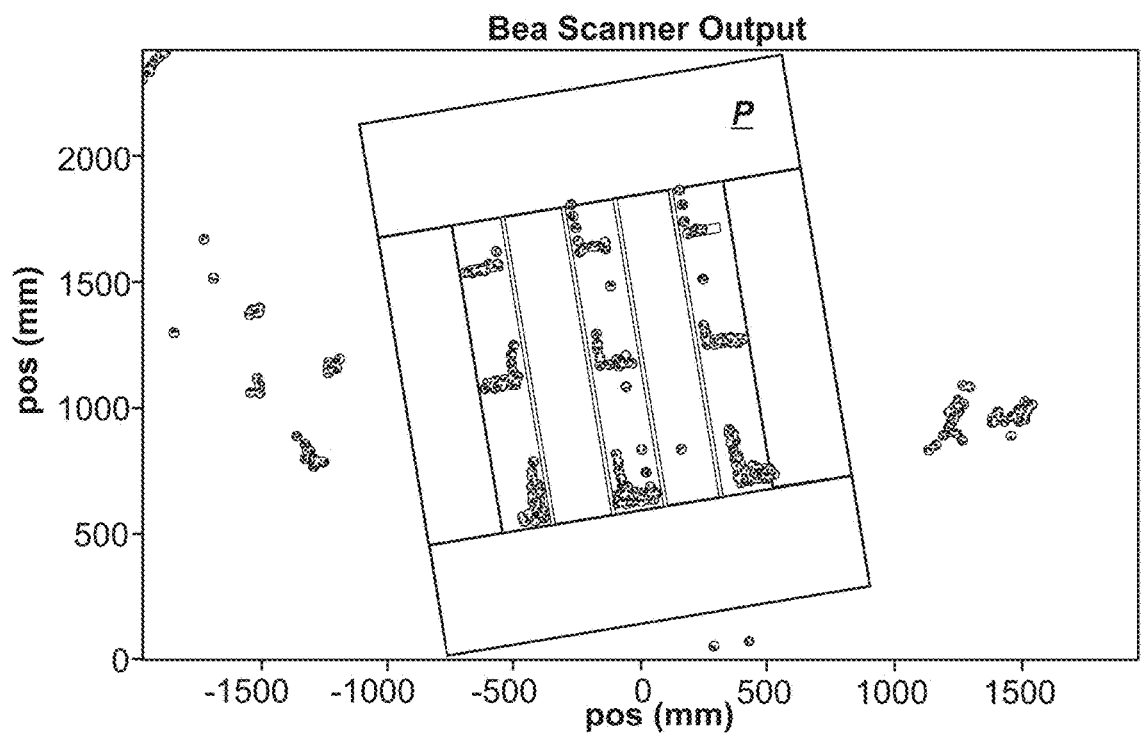
Figure 11D:
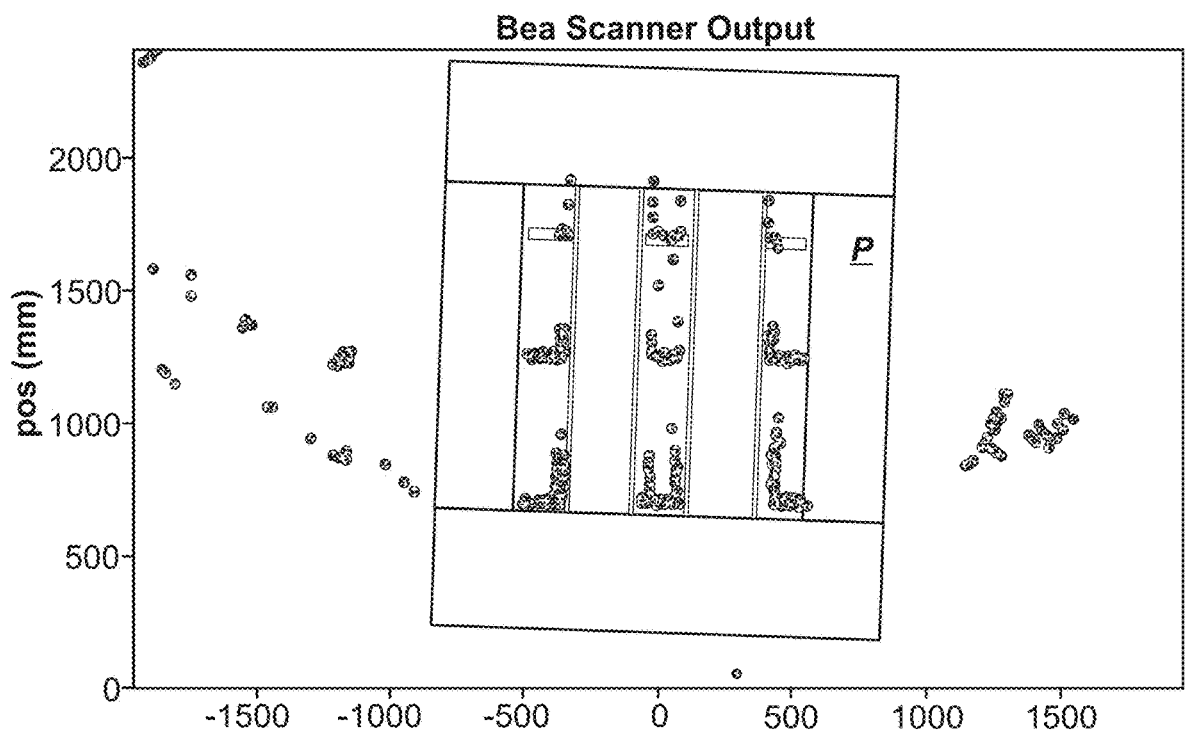
Figure 11E:
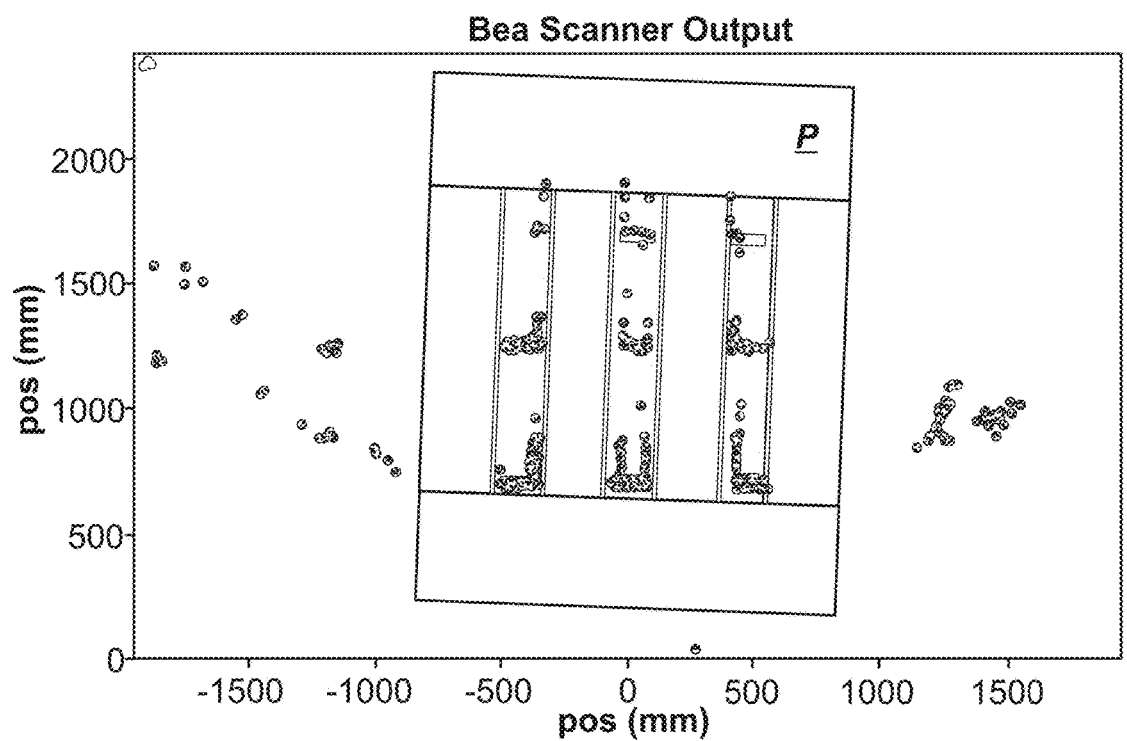
Figure 11F:
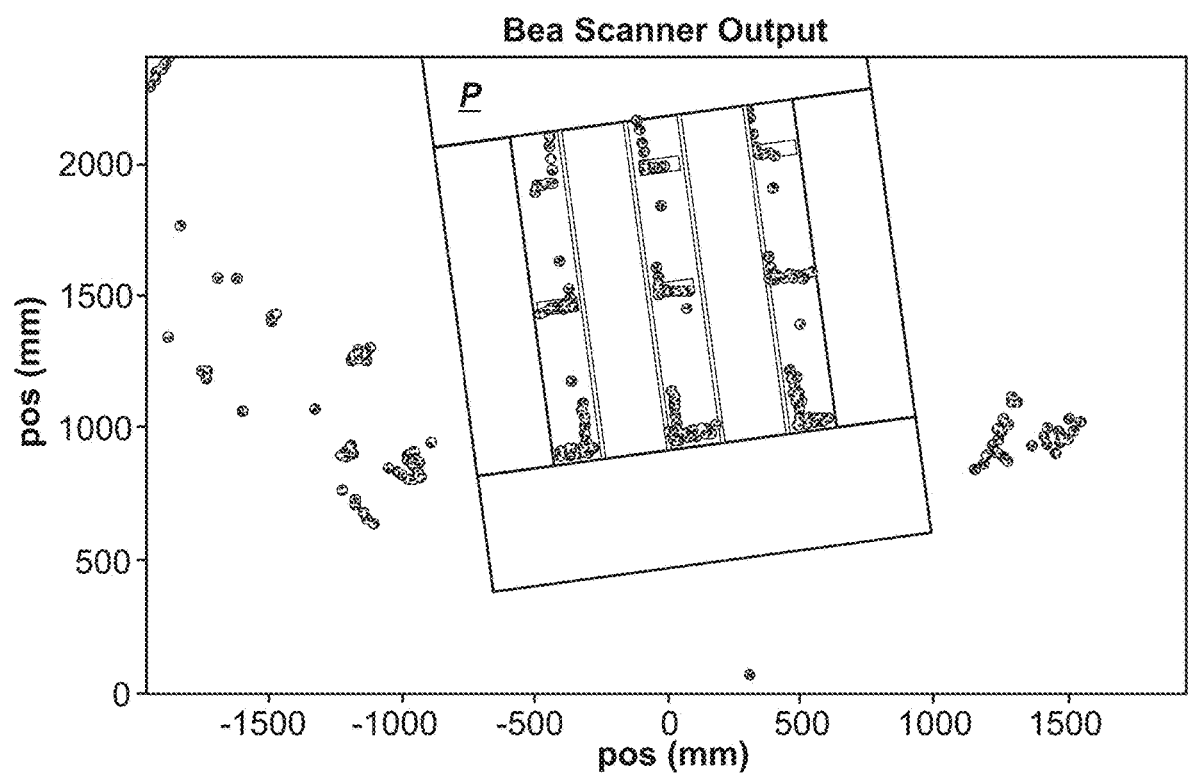
Figure 11G:
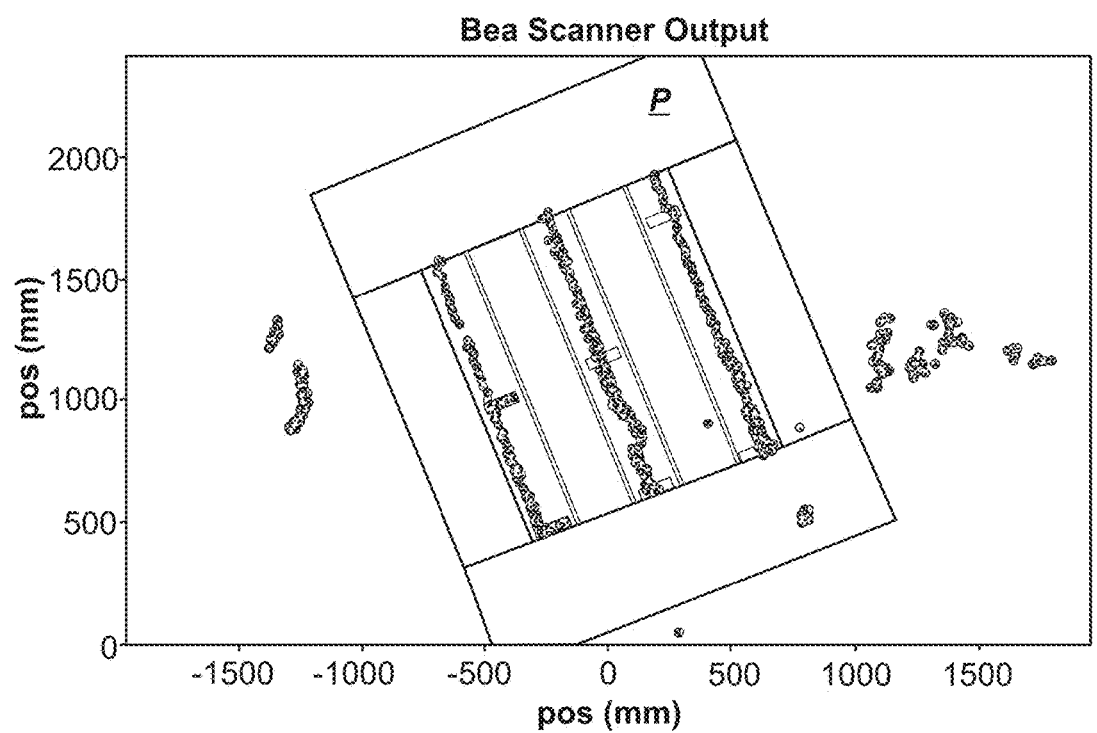
Figure 11H:
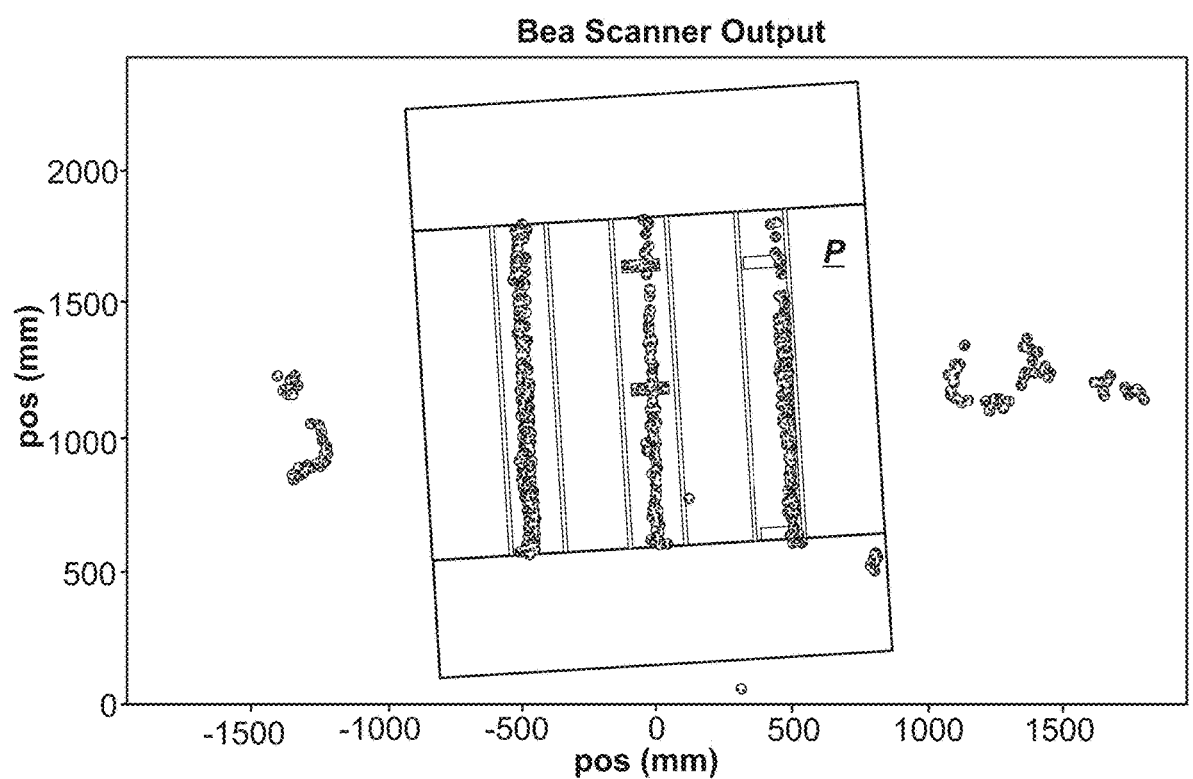
Figure 11I:
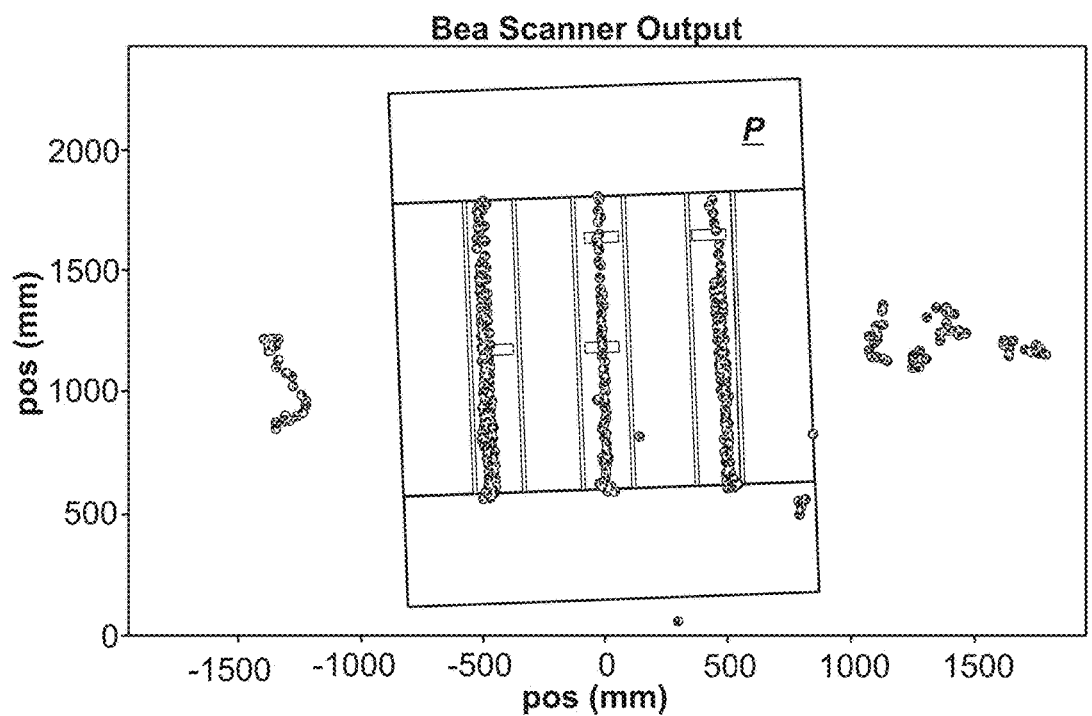
Figure 11J:
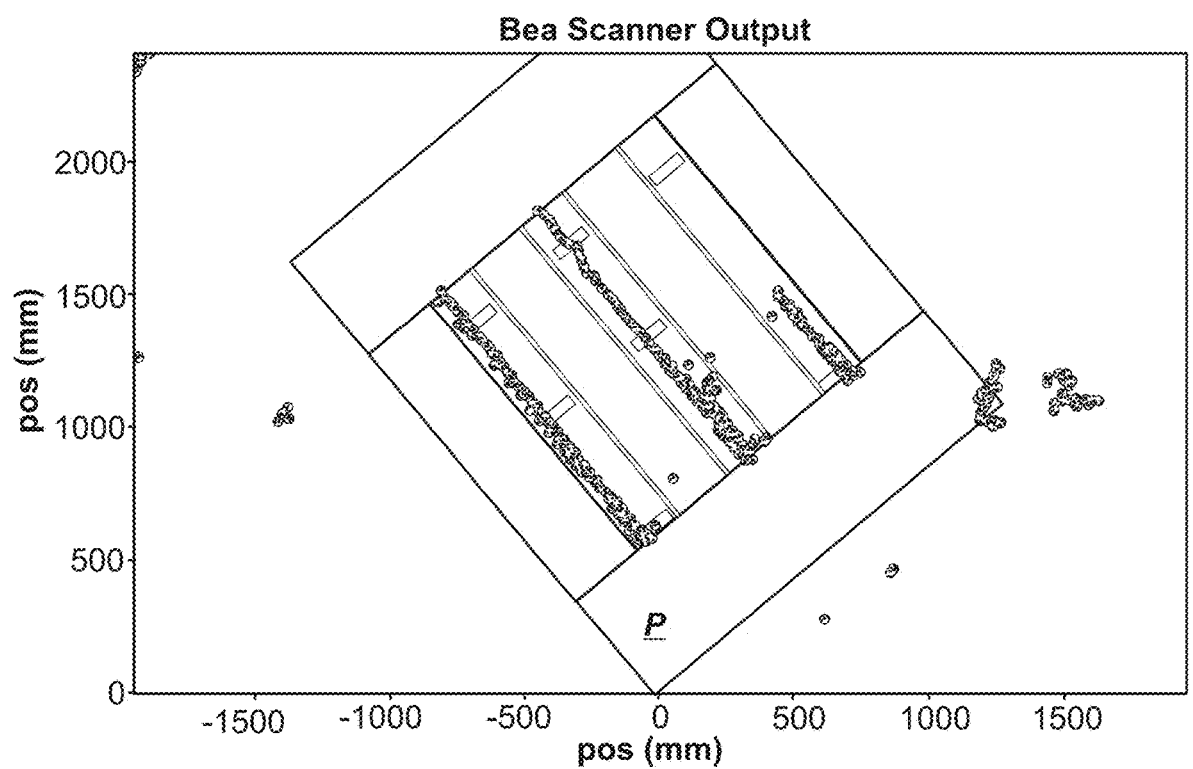
Figure 11K:
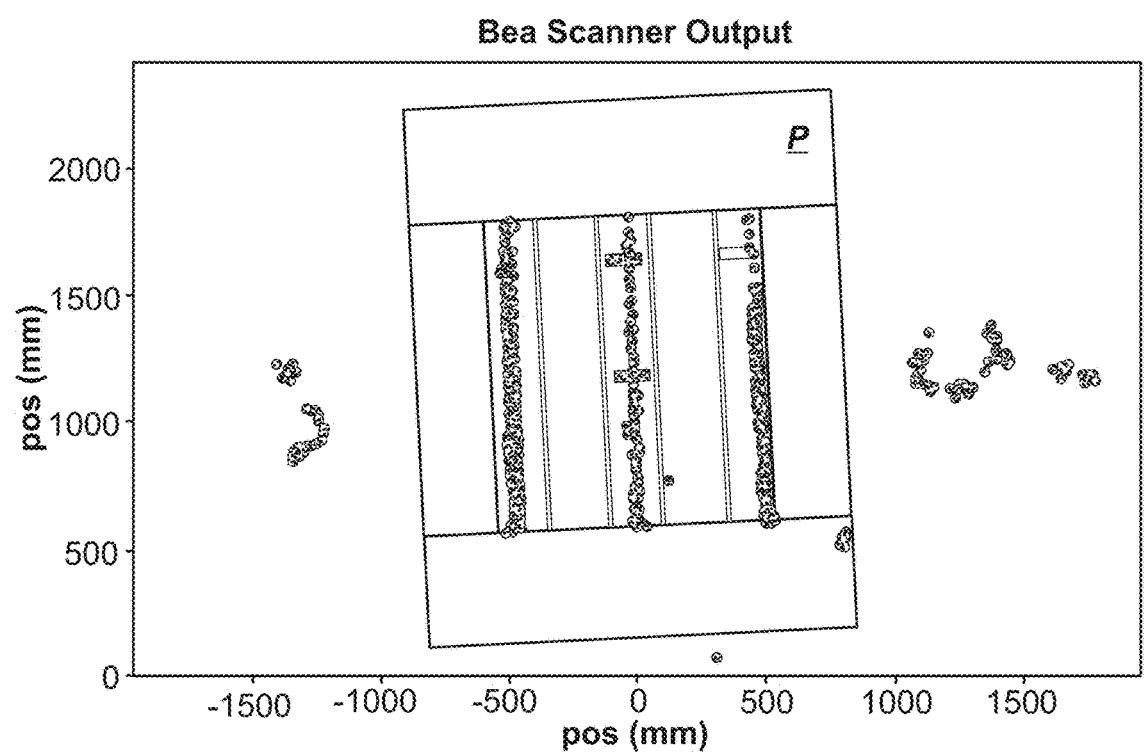
Figure 11L:
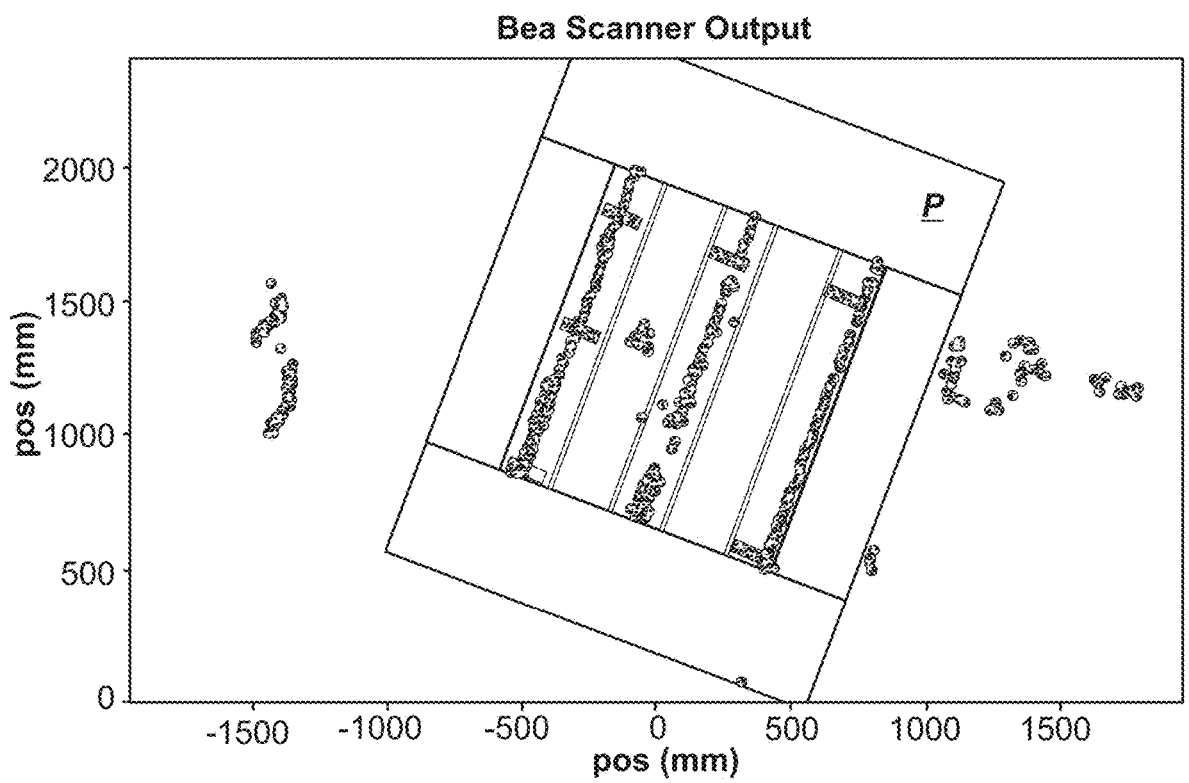
Figure 11M:
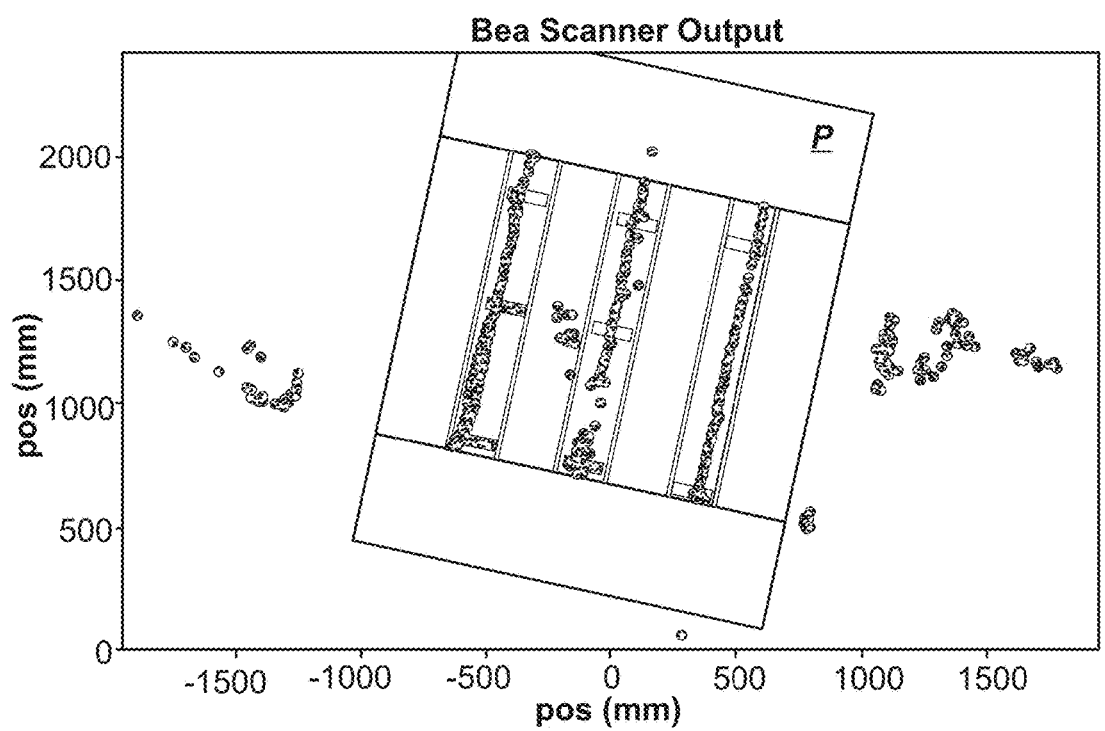
Figure 11N:
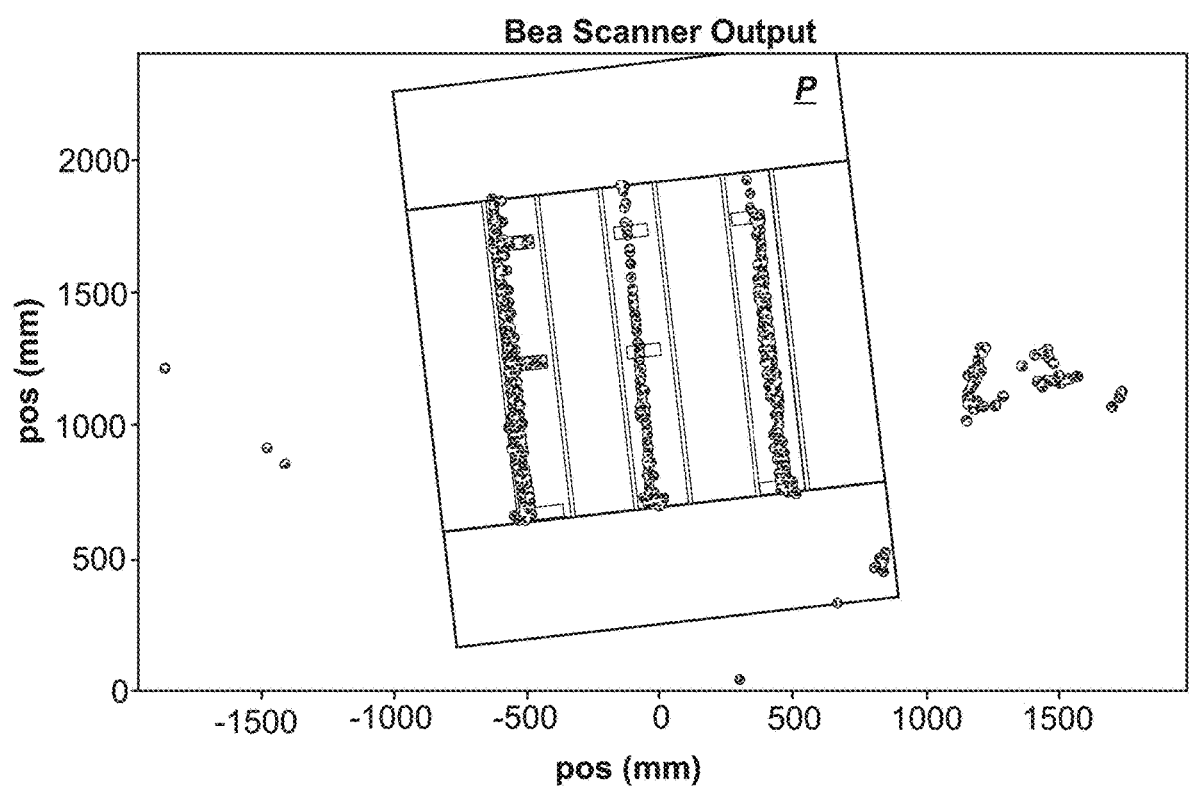
Figure 11O:
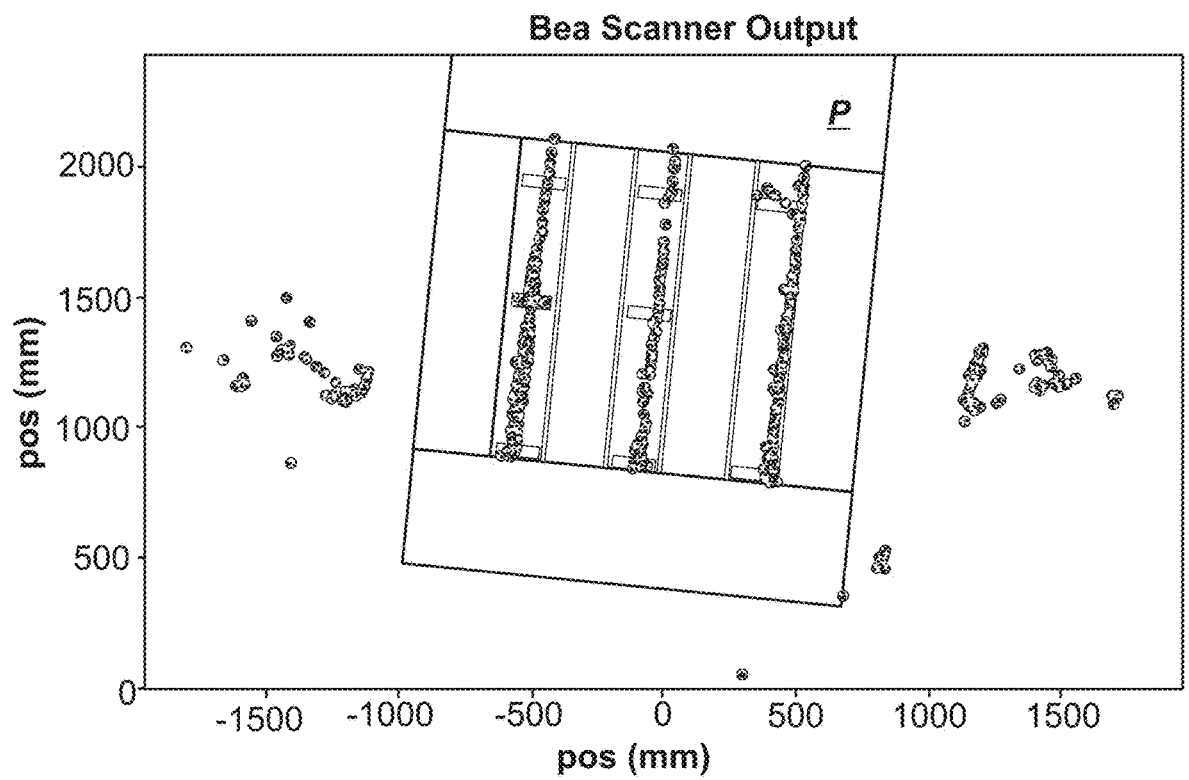
Figure 11P:
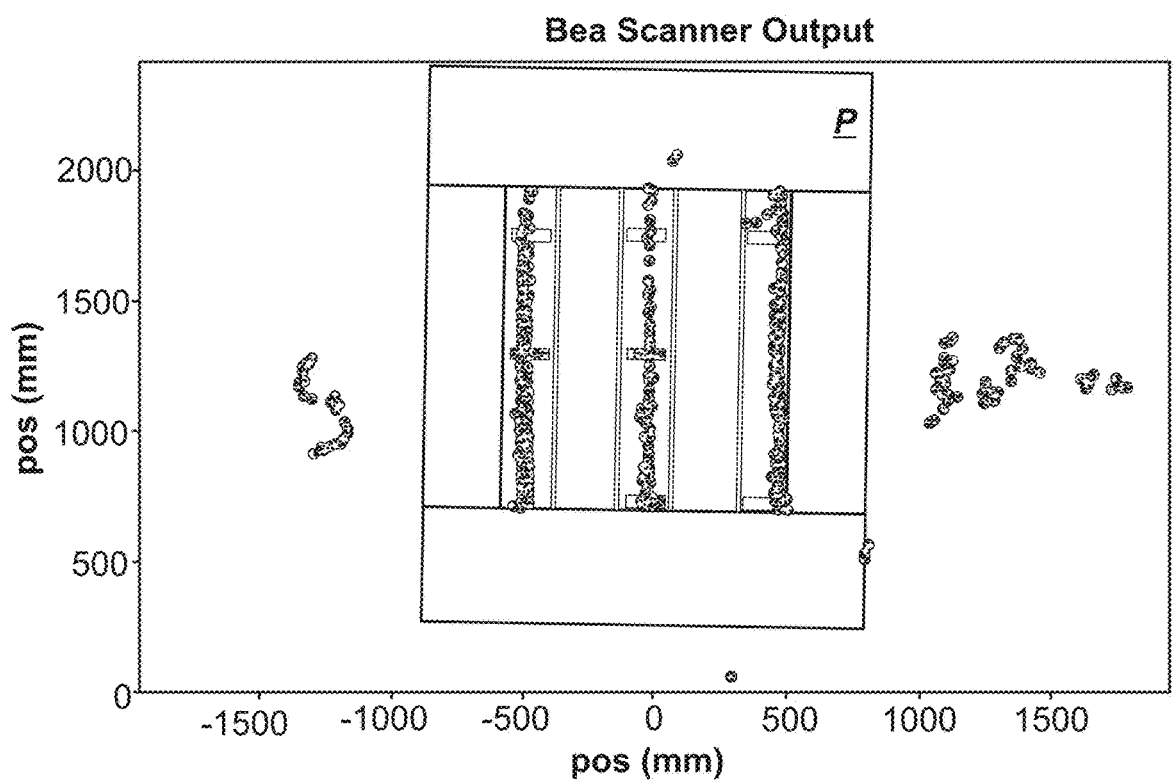
Figure 11Q:
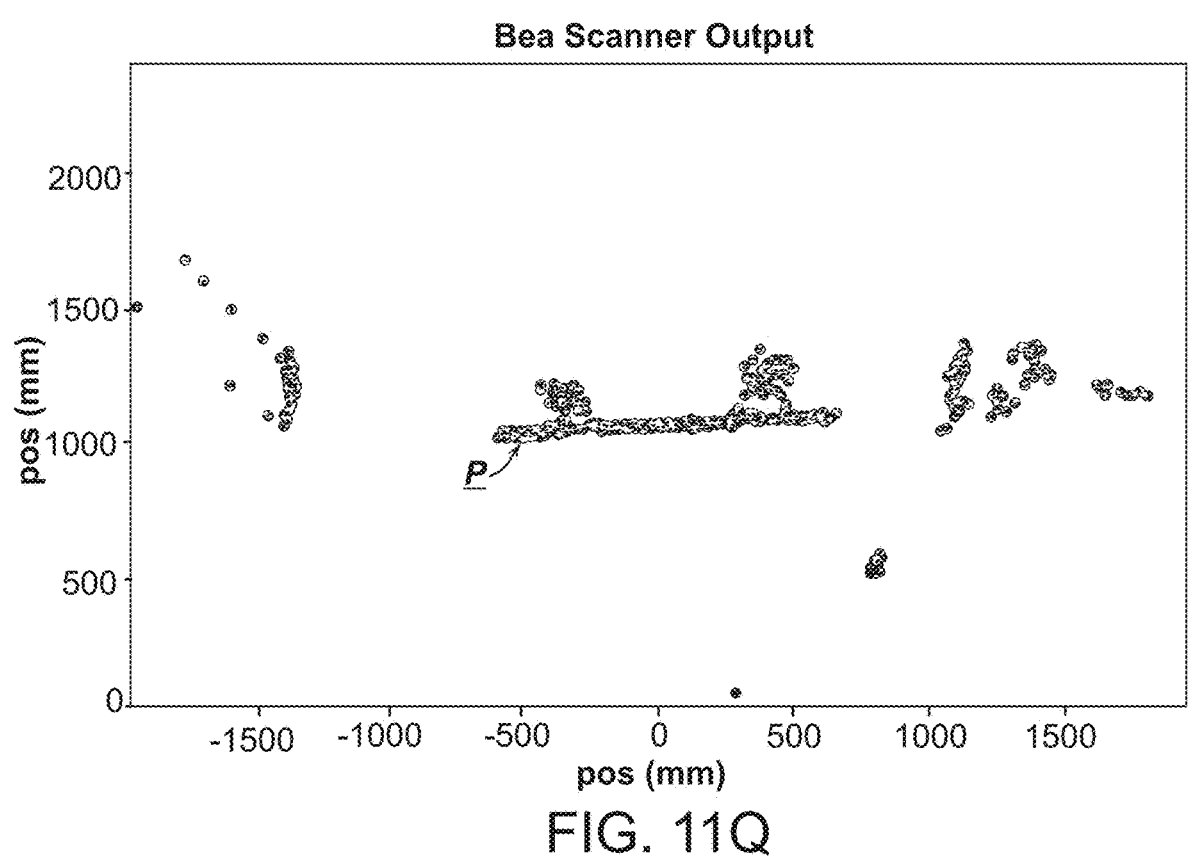

FIGS. 11A-11Q show data acquired from an embodiment of a sensor positioned near a pallet, in accordance with aspects of the present inventive concepts. In FIGS. 11A-11Q, a stringer pallet was used. In FIGS. 11A-11Q, a sensor/scanner 40 is positioned near the (0,0) coordinate, or the (0,0) coordinate can be at the center of the two forks. The different images show different sensor/scanner data results acquired when the pallet is at various theta orientations, which is an angle off rotation relative to the travel path of the vehicle and fork tip scanners. As can be seen, from different angles, the depth down the pallet pockets can vary.

FIG. 11Q is a side view of the pallet relative to the scanner, wherein the pallet looks like an obstacle.

In some embodiments, other sensors are used. The BEA flat scanners are a suitable scanner, chosen largely because their small size allows fork tip mounting. In alternative embodiments, a 3D sensor is used instead with a similar strategy. In some embodiments in which a 3D sensor is used, the system is configured to detect the presence of objects at different heights. In some embodiments in which a 3D sensor is used, the system is configured to detect the height of one or more objects.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It will be understood that the inventive concepts can be defined by any combination of the claims, regardless of the stated dependencies, wherein different combinations of claims can represent different embodiments of the inventive concepts.

What is claimed is:

1. A mobile robot, comprising:
   a drive portion constructed and arranged to facilitate autonomous navigation of the mobile robot;
   a load portion comprising a first fork having a distal first fork tip and a second fork having a distal second fork tip, the first and second fork tips configured to respectively engage first and second pockets of a pallet;
   a first fork tip scanner having a first housing configured to fit within the first fork tip and a first laser scanner within the first housing, the first laser scanner configured to project a rotating scan beam through an end of the first fork tip to form a first scan plane emitting outward from the first fork tip; and at least one processor configured to process scan data from at least the first scan plane to determine an orientation of the pallet and to adjust navigation of the mobile robot to align the first and second forks with the first and second pockets of the pallet based on the determined orientation.

2. The system of claim 1, wherein the first laser scanner comprises a first scanning LIDAR arranged to generate the first scan plane to collect at least a portion of the scan data.

3. The system of claim 2, wherein the first scan plane is oriented parallel to a ground plane.

4. The system of claim 1, wherein
a second fork tip scanner having a second housing configured to fit within the second fork tip and a second laser scanner within the second housing, the second laser scanner configured to project a second rotating scan beam through an end of the second fork tip to form a second scan plane emitting outward from the second fork tip that partially overlaps the first scan plane.

5. The system of claim 4, wherein the second laser scanner comprises a second scanning LIDAR arranged to generate the second scan plane to collect at least a portion of the scan data.

6. The system of claim 5, wherein the second scan plane is oriented downward toward a ground plane, at a tilt angle below horizontal.

7. The system of claim 6, wherein the first scan plane is oriented parallel to the ground plane.

8. The system of claim 6, wherein the tilt angle is up to 10 degrees from horizontal toward the ground plane.

9. The system of claim 6, wherein the tilt angle is up to 5 degrees #2 degrees, from horizontal toward the ground plane.

10. The system of claim 6, wherein the tilt angle is up to 3 degrees #1 degree, from horizontal toward the ground plane.

11. The system of claim 1, wherein the at least one processor is configured to perform a coarse fit operation on the scan data and then perform a fine fit operation on the scan data to determine if an object indicated by the scan data is an obstacle or the pallet.

12. The system of claim 11, wherein, as part of the course fit operation, the at least one processor is configured to process the scan data to determine a best score with respect to a plurality of digital pallet models, wherein the at least one processor is configured to step through an entire scan range, transform scan data into points, and score the points based on a best fit to a digital pallet model from the plurality of digital pallet models.

13. The system of claim 11, wherein, as part of the fine fit operation, the at least one processor is configured to iteratively process the scan data as long as a fit score relative to a digital pallet model from the plurality of digital pallet models continues to improve and to identify the pallet when the fit score is above the minimum score threshold.

14. An object engagement method, comprising:
providing a mobile robot, comprising:
a drive portion facilitating auto-navigation of the mobile robot;
a load portion comprising a first fork having a distal first fork tip and second fork having a distal second fork tip, the first and second fork tips configured to respectively engage first and second pockets of a pallet;

the first fork tip scanner having a first housing within the first fork tip and a first laser scanner within the first housing; and at least one processor configured to execute an algorithm to collect and process scan data;

projecting a rotating scan beam through an end of the first fork tip thereby forming a first scan plane emitting outward from the first fork tip;

collecting scan data from the scanning plane processing the scan data from at least the first scan plane to determine an orientation of the pallet; and adjusting navigation of the mobile robot to align the first and second forks with the first and second pockets of the pallet based on the determined orientation.

15. The method of claim 14, further comprising:
using the scan data, determining a degree of rotation of the pallet relative to a travel path of the pallet transport system.

16. The method of claim 15, further comprising:
using the scan data, the at least one processor identifying the pallet from a plurality of digital pallet models.

17. The method of claim 16, further comprising:
using the at least one processor, performing a coarse fit operation on the scan data and then performing a fine fit operation on the scan data to determine if an object indicated by the scan data is an obstacle or the pallet.

18. The method of claim 17, wherein the course fit operation comprises:
processing the scan data to determine a best score with respect to a plurality of digital pallet models, including stepping through an entire scan range, transforming scan data into points, and scoring the points based on a best fit to a digital pallet model from the plurality of digital pallet models.

19. The method of claim 17, wherein the fine fit operation comprises:
iteratively processing the scan data as long as a fit score relative to a digital pallet model from the plurality of digital pallet models continues to improve and to identify the pallet when the fit score is above the minimum score threshold.

20. The method of claim 14, wherein emitting outward from the first fork tip comprises emitting in a direction of mobile robot travel for pallet engagement.

21. The mobile robot of claim 1, wherein emitting outward from the first fork tip comprises emitting in a direction of mobile robot travel for pallet engagement.

22. A mobile robot, comprising:
a drive portion constructed and arranged to facilitate autonomous navigation of the mobile robot;
a load portion comprising a first fork having a distal first fork tip and a second fork having a distal second fork tip;
a first fork tip scanner having a first housing configured to fit within the first fork tip and a first laser scanner within the first housing, wherein the first housing provides an airtight and/or water tight volume for the first laser scanner and the first laser scanner is configured to project a rotating scan beam through an end of the first fork tip to form a first scan plane emitting outward from the first fork tip; and
at least one processor configured to process scan data from at least the first scan plane to:
determine that a detected object is a pallet when there is a fit between the scan data and one of a plurality of digital pallet models based on a fit score that is iterated as long as the fit score relative to a digital pallet model continues to improve and a resulting fit score is above a threshold; and determine an orientation of the pallet and adjust navigation of the mobile robot to align the first and second forks with first and second pockets of the pallet based on the determined orientation.

* * * * *

UNITED STATES PATENT AND TRADEMARK OFFICE
CERTIFICATE OF CORRECTION

PATENT NO. : 12,153,431 B2  
APPLICATION NO. : 17/490345  
DATED : November 26, 2024  
INVENTOR(S) : Chun Zhang et al.

Page 1 of 1

It is certified that error appears in the above-identified patent and that said Letters Patent is hereby corrected as shown below:

In the Claims

Column 15, Line 35, Claim 9, remove "#" and add --±--.
Column 15, Line 38, Claim 10, remove "#" and add --±--.

Signed and Sealed this  
Seventh Day of January, 2025

Derrick Brent  
*Acting Director of the United States Patent and Trademark Office*